US008588278B2

(12) United States Patent
Martin

(10) Patent No.: US 8,588,278 B2
(45) Date of Patent: Nov. 19, 2013

(54) METHOD OF RESOLVING AMBIGUITY, METHOD OF LOCATION OF A RECEIVER BY RADIONAVIGATION COMPRISING AN AMBIGUITY RESOLUTION STEP AND LOCATION RECEIVER

(75) Inventor: Nicolas Martin, Bourg les Valence (FR)

(73) Assignee: Thales, Nueilly sur Seine (FR)

( * ) Notice: Subject to any disclaimer, the term of this patent is extended or adjusted under 35 U.S.C. 154(b) by 914 days.

(21) Appl. No.: 12/707,406

(22) Filed: Feb. 17, 2010

(65) Prior Publication Data

US 2010/0254439 A1 Oct. 7, 2010

(30) Foreign Application Priority Data

Feb. 19, 2009 (FR) ...................................... 09 00763

(51) Int. Cl.
*H04B 1/00* (2006.01)
(52) U.S. Cl.
USPC .......................................... 375/150; 375/130
(58) Field of Classification Search
USPC .................... 375/150, 324–327, 339, 343
See application file for complete search history.

(56) References Cited

U.S. PATENT DOCUMENTS

| 7,848,217 | B2 * | 12/2010 | Stahlberg et al. ............. | 370/207 |
|---|---|---|---|---|
| 2003/0058927 | A1 * | 3/2003 | Douglas et al. ............... | 375/147 |
| 2003/0174792 | A1 * | 9/2003 | Bow et al. ..................... | 375/343 |
| 2004/0201521 | A1 * | 10/2004 | Alvarez et al. ........... | 342/357.12 |
| 2004/0208236 | A1 * | 10/2004 | Fenton .......................... | 375/148 |
| 2006/0215739 | A1 * | 9/2006 | Williamson et al. .......... | 375/149 |
| 2007/0201537 | A1 * | 8/2007 | De Wilde et al. ............. | 375/147 |
| 2007/0205940 | A1 * | 9/2007 | Yang et al. ............... | 342/357.12 |
| 2007/0230545 | A1 * | 10/2007 | Lennen ......................... | 375/149 |
| 2007/0237269 | A1 * | 10/2007 | Lillo et al. .................... | 375/343 |
| 2008/0037614 | A1 * | 2/2008 | Douglas ........................ | 375/150 |
| 2009/0147835 | A1 * | 6/2009 | Hollreiser et al. ............ | 375/150 |
| 2010/0046589 | A1 * | 2/2010 | Douglas ........................ | 375/150 |
| 2010/0208775 | A1 * | 8/2010 | Weill ............................. | 375/150 |
| 2010/0231454 | A1 * | 9/2010 | Jenkins et al. ................ | 342/386 |
| 2010/0246645 | A1 * | 9/2010 | Fenton et al. ................. | 375/150 |
| 2011/0068958 | A1 * | 3/2011 | Knight et al. .................. | 341/51 |

FOREIGN PATENT DOCUMENTS

EP 1598677 A1 11/2005

OTHER PUBLICATIONS

Vincent Heiries et al.: "Analysis of Non Ambiguous BOC Signal Acquisition Performance," ION GNSS. International Technical Meeting of the Satellitedivision of the Institute of Navigation, Washington, DC, US, No. 17th, Sep. 21, 2004, pp. 2611-2622, XP002471945.

(Continued)

*Primary Examiner* — Emmanuel Bayard
(74) *Attorney, Agent, or Firm* — Baker & Hostetler LLP

(57) ABSTRACT

Method of resolving ambiguity for determining the main peak of the autocorrelation function of signals transmitted by a set of satellites and received by a receiver of a radionavigation system, a signal received originating from a satellite comprising two received spectral components right and left, the said method comprising the following steps:

the right and left components received are demodulated by a BPSK demodulation method the central carrier is tracked by means of a central carrier loop which calculates estimations of central carrier phase errors so as to generate carrier commands, the code is tracked by means of a code loop which calculates instantaneous estimations of code errors so as to generate code commands, wherein the code commands are furthermore generated on the basis of instantaneous estimations of sub-carrier phase errors.

29 Claims, 11 Drawing Sheets

(56) References Cited

OTHER PUBLICATIONS

Olivier Julien et al.: "ASPeCT: Unambiguous Sine-BOC (n,n) Acquisition/Tracking Technique for Navigation Applications," IEEE Transactions on Aerospace and Electronic Systems, IEEE Service Center, Piscataway, NJ, US, vol. 43, No. 1, Jan. 1, 2007, pp. 150-162, XP011180922.

Phillip W. Ward: "A Design Technique to Remove the Correlation Ambiguity in Binary Offset Carrier (BOC) Spread Spectrum Signals," Proceedings of the ION National Technical Meeting, The Institutte of Navigation, US, Jan. 26, 2004, pp. 886-896, XP001207302.

Search Report issued in corresponding French application No. 0900763 on Oct. 13, 2009.

* cited by examiner

METHOD OF RESOLVING AMBIGUITY, METHOD OF LOCATION OF A RECEIVER BY RADIONAVIGATION COMPRISING AN AMBIGUITY RESOLUTION STEP AND LOCATION RECEIVER

CROSS-REFERENCE TO RELATED APPLICATIONS

This application claims priority to foreign France patent application No. 0900763, filed on Feb. 19, 2009, the disclosure of which is hereby incorporated by reference in its entirety.

FIELD OF THE INVENTION

The field of the invention is that of satellite radionavigation.

Satellite radionavigation makes it possible to obtain the position of the receiver through a resolution similar to that of triangulation, by using the pseudo-distances measured on the basis of the propagation times of the signals dispatched by the satellites by a receiver placed at the position to be located.

BACKGROUND OF THE INVENTION

To facilitate the reception of the signals transmitted by the satellites crossing large distances and being transmitted with limited powers, they are rendered as insensitive as possible to narrowband glitches by increasing their bandwidth by means of a spread spectrum technique by modulating the signal with a pseudo-random code.

The information to be transmitted at the level of the satellites, once put into the form of a series of frequency-spread binary data, is transposed into an emission frequency span by modulation with an emission carrier.

On reception, the binary information contained in a satellite radio signal of a positioning system is extracted by two demodulations.

The BPSK (Binary Phase Shift Keying) modulation technique consists in modulating, as may be seen in FIG. 1, the carrier of the RF (radio-frequency) signal transmitted by the satellite by a pseudo-random sequence known in advance of +1 and of −1, called a spreading code.

Represented in FIG. 1, from top to bottom, are the temporal evolution charts for the various components of a BPSK modulation radionavigation signal, namely, its spreading code, its carrier and the signal thus modulated, and then the autocorrelation function of the signal thus modulated and finally the spectrum of the modulated signal, that is to say the frequency distribution of its spectral density.

On reception at the antenna level it is possible to write:

$$S_{BPSK}(t) = \cos(2\pi \cdot Fpc \cdot t_e + \phi_0) \cdot \text{code}(t_e)$$

With:
$t_e = t_e(t)$: date at which the signal received at the current instant t was transmitted
$\phi_0$: phase shift of the signal received
Or equivalently:

$$S_{BPSK}(t) = \cos(\phi pc) \cdot \text{code}(\phi \text{code})$$

BPSK modulation produces a cardinal sine power spectrum $D(f)$ and a triangular autocorrelation function $R(\tau)$. The autocorrelation function $R(\tau)$ indicates the amplitude resulting from correlating the spreading code with a replica of this code delayed by $\tau$. This function makes it possible to forecast the behaviour of the receiver which performs a correlation of the signal received with local replicas shifted by the spreading code so as to find the energy of the signal and perform a pseudo-distance measurement.

Certain navigation systems use double carrier shift signals consisting of an RF carrier (termed the "central carrier") modulated both by a square sub-carrier and a spreading code. This modulation is called BOC modulation. This modulation exhibits a spectrum with two main components and an autocorrelation function with multiple peaks.

These signals are called BOC ("Binary Offset Carrier") signals.

Represented in FIG. 2, from top to bottom, are the temporal evolution charts for the various components of a radionavigation signal received by a receiver, without double carrier shift defects, namely: its spreading code, the rectangular sub-carrier, the carrier and then the carrier thus modulated, and the autocorrelation function, and finally the frequency distribution of the spectral density of the modulated signal.

On reception at the antenna level it is possible to write:

$$S_{BOC}(t) = \cos(2\pi \cdot Fpc \cdot T_e + \phi_0) \cdot \text{sign}(\sin(2\pi \cdot Fsp \cdot t_e)) \cdot \text{code}(t_e)$$

With:
$\text{sign}(x) = 1$ if $x \geq 0$ and $\text{sign}(x) = -1$ if $x < 0$
Or equivalently:

$$S_{BOC}(t) = \cos(\phi pc) \cdot \text{sign}(\sin(\phi sp)) \cdot \text{code}(\phi \text{code})$$

If the sub-carrier is regarded as a sinusoidal signal we may write:

$$S_{BOC}(t) \approx \cos(\phi pc) \cdot \sin(\phi sp) \cdot \text{code}(\phi \text{code})$$

i.e.

$$S_{BOC}(t) \approx \tfrac{1}{2}[\sin(\phi pc + \phi sp) - \sin(\phi pc - \phi sp)] \cdot \text{code}(\phi \text{code})$$

Or equivalently:

$$S_{BOC}(t) \approx \tfrac{1}{2} \cdot \sin(2\pi \cdot FpD \cdot t_e + \phi_0) \cdot \text{code}(t_e) - \tfrac{1}{2} \cdot \sin(2\pi \cdot FpG \cdot t_e + \phi_0) \cdot \text{code}(t_e)$$

The two main components of BPSK type are retrieved with a carrier at the frequency FpD shifted to the right and a carrier at the frequency FpG shifted to the left.

Hereinafter, the following notation and definitions will be appropriate. The central carrier frequency Fpc is, by definition, the frequency of the carrier modulated by the code and the square sub-carrier is the frequency which is situated in the middle of the two carrier frequencies of the two components right Sd and left Sg.

The sub-carrier frequency Fsp is by definition the frequency of the square sub-carrier, which is equal to the distance between the carrier frequency of the left FpG or right FpD component of the spectrum and the central carrier frequency Fpc.

The frequency of the code is by definition the inverse of the duration of a code slot Lchip.

Hereinafter, the following notation will be used
Fpc Central carrier frequency $$Fpc = (FpG + FpD)/2$$

$\phi pc$ is the phase of the central carrier received $$\phi pc = 2\pi \cdot Fpc \cdot t_e$$

Fsp Sub-carrier frequency $$Fsp = (FpG - FpD)/2$$

$\phi sp$ phase of the sub-carrier received (rad)

$$\phi sp = 2\pi \cdot Fsp \cdot t_e$$

$\lambda sp$ wavelength of the sub-carrier $\lambda spr = c/Fsp$

FpD Carrier frequency of the right component
FpG Carrier frequency of the left component $$FpG = Fpc - Fsp$$

$$FpD = Fpc + Fsp$$

Fcode Frequency of the spreading code
φpc is the phase of the code received $$\phi code = t_e$$

λcode is the wavelength of the spreading code $$\lambda code = c/Fcode$$

$$Lchip = 1/Fcode$$

φcode is the phase of the spreading code $$\phi code = Fcode \cdot t$$

BOC modulation has a double aim:
to free the spectrum between the two components for other already existing signals,
to improve the precision of the measurements in the presence of thermal noise and multi-paths.

The drawback of this modulation is that in order to correctly demodulate the signal, it is necessary to find the main peak of the autocorrelation function so as to have the maximum of energy and to provide coherent measurements between the satellites, otherwise biased pseudo-distance measurements are provided.

There exist methods of the BPSK type (termed "BPSK like" methods) in which, in a transition phase, the two components left and right of the spectrum of the double carrier shift signals dispatched by the satellites are demodulated in parallel as if each component were a conventional BPSK signal, with no local sub-carrier, each of these components having a carrier shifted to the left or to the right. The processing is performed in parallel for the signals originating from the various satellites.

The demodulation conventionally consists in correlating in parallel the components generated locally with the components received from the satellite considered. Combination of the local components forms a local signal comprising a local code and a local carrier.

The receiver seeks to slave in phase, by means of a code loop and a central carrier loop, the local codes and, respectively, the local carriers of the local components, with the codes and, respectively, the carriers of the two components received by searching for the maximum of the autocorrelation function (in the BPSK like mode, the autocorrelation function corresponds practically to the envelope of the autocorrelation function of the double carrier shift signal).

Once the code loop has converged on the maximum of the envelope of the autocorrelation function, the receiver undertakes a tracking phase. In the tracking phase, the main peak of the autocorrelation function of the BOC signal is followed in BOC mode or in reconstituted BOC mode by means of code and central carrier loops.

In the BOC mode the signal is not decomposed into two components, right and left.

In the tracking phase in reconstituted BOC, the two components left and right are demodulated, in BPSK mode, the demodulated left and right complex components are summed in a coherent manner and the central carrier and code loops are closed.

The measurements of pseudo-speed and pseudo-distances, are formulated on the basis, respectively, of the phase of the local carrier and of the phase of the local code during the tracking phase.

However, an ambiguity may persist while switching to the tracking phase. There is no certainty that the fact of positioning ourselves on the maximum of the envelope of the autocorrelation function in the transition phase, leads us, in the tracking phase, to follow the main peak of the autocorrelation function of the signal in reconstituted BOC or BOC mode.

When the signal possesses the ideal, perfectly symmetric form, as is the case in respect of FIG. 2, the autocorrelation function R(τ) always exhibits a predominant main peak at the centre and secondary peaks of lesser amplitude on either side. In this case, it is relatively easy, by comparing the amplitudes or by utilizing the envelope of this function, to pinpoint the main peak of this function with high confidence.

However, when the signal is deformed by the analogue pathways (non-ideal transfer functions on the antenna, the filters, the amplifiers and the frequency changing analogue multipliers) within the receiver or within the satellite, it is possible to obtain a non-symmetric autocorrelation function, or indeed in the worst case one which is anti-symmetric with two main peaks on either side of the centre, of opposite signs, as represented in FIG. 3a. In this case, it is difficult, or indeed impossible, to make the choice to switch to nominal tracking mode based on a criterion of maximum amplitude of the envelope of the autocorrelation function. Furthermore, energy is lost with respect to the symmetric case.

This phenomenon is due to an incoherence between the relative phase shift of the two components on one side and the mean group delay on the two components on the other. This incoherence is due to a non-constant group delay in the passband (or stated otherwise a phase delay which is non-linear in frequency). This defect is called "phase differential". An example of this phenomenon has been represented in FIG. 3b. In this figure have been represented, from top to bottom, the graphs, as a function of frequency, of the group delay, of the phase delay and of the spectral distribution of the energy of the signal exhibiting these defects. The same phenomena occur when defects affect the signals transmitted by a satellite.

The presence of multi-paths can also bias the convergence of the code in BPSK mode and induce a false lock-on to a secondary peak in the tracking phase if the code error, that is to say the phase difference between the local code and the code of the signal received exceeds, on input to the tracking phase, half the distance between two consecutive peaks of the autocorrelation function of the BOC signal.

In the ideal case where the limited-band filters at transmission and at reception let through all the secondary components of the signal that lie between the 2 main right and left components of the spectrum without deforming them (ideal template), the form of the autocorrelation function in BPSK demodulation remains sufficiently triangular to allow, before the switch to tracking mode, convergence of the code to the main peak of the autocorrelation function of the BOC signal even in the presence of multi-paths.

However, the analogue filters which are non-ideal at transmission and at reception round the form of the autocorrelation function, thereby increasing the sensitivity to multi-paths during the convergence of the code in the transition phase, with a real risk of false lock-on to a secondary peak of the autocorrelation function in the tracking phase.

In order to limit the risks of false lock-on to a secondary peak of the autocorrelation function during the tracking phase, methods are known for resolving ambiguity (ie removing ambiguity), during the transition phase which precedes the tracking phase, which are suitably adapted for making the code converge, before tracking, onto the main peak of the autocorrelation function of the signal received.

The object of the method of resolving ambiguity is to generate a local code which is sufficiently close to the code received, before the switch to tracking mode, to ensure that the tracking is done on the main peak of the autocorrelation function of the BOC signal. It will be considered hereinafter that the code error is zero when we are at the top of the main peak of the autocorrelation function of the BOC signal.

In the article "Acquisition of the PRS BOC(15,2.5) Signal in Presence of Multipath" by Martin, N; Guichon, H; Revol, M; Hollreiser, M; Crisci; there is proposed a method for resolving ambiguity so as to avoid false lock-ons to a secondary peak, due to multi-paths.

We shall first of all describe a digital processing channel of a receiver, adapted for implementing a method of resolving ambiguity for a BOC signal transmitted by a satellite of index i. The signals transmitted by the satellite are, prior to processing by the digital processing channels, received and digitized by the analogue processing pathways. A digital processing channel is represented in the form of a block diagram represented in FIG. 4. A digital processing channel is able to process signals received 1$i$ originating from one and the same satellite i.

The spectrum of a BOC signal comprises two spectral components $Sd_i$ and $Sg_i$, as visible in FIG. 2. A BOC signal is regarded as a signal having two BPSK components with an identical code but two distinct carriers, a deterministic and known relation existing between the transmit phases, before the defects due to the analogue part of the receiver (and possibly of the satellite).

The digital processing channel of the satellite of index i exhibits a hardware correlation pathway 50 able to generate the local codes and the local carriers of the right and left components of the local signal and to correlate, thereafter, these local components with the right and left components of the signal received. The local signal itself comprises a local code and two local carriers right and left and a local central carrier.

The software channel 40 comprises a code loop DLL and a central carrier loop PLL which are able to identify phase deviations between the local code and the code of the signal received and respectively, the local central carrier and the central carrier received. The code and central carrier loops thereafter generate commands for controlling the hardware correlation pathway 50 and generating a new local signal.

The central carrier phase loop PLL makes it possible to ensure precise tracking of the dynamics of the phases of the signals (due to the motion of the antenna, to the drifting of the clock of the receiver and to the displacements of the satellites).

The hardware correlation pathway 50 comprises two left G and right D correlation channels, to carry out the demodulation in BPSK mode. The two left G and right D correlation channels are able to independently demodulate, respectively, the two spectral components right $Sd_i$ and left $Sg_i$ of a radionavigation signal originating from a satellite of index i. In FIG. 4, the thick lines represent complex signals and the thin lines real signals.

The left G and right D correlation channels comprise means for correlating the right $Sd_i$ and left $Sg_i$ spectral components of a signal received 1$i$ with the right and left local components of a signal produced locally so as to produce complex outputs of the right $Z_{AD}$, $Z_{PD}$, $Z_{RD}$ and, respectively, left $Z_{AG}$, $Z_{PG}$, $Z_{RG}$ correlation pathways. These outputs are different for each digital processing channel of index i but for greater clarity, the index i is not indicated on these outputs.

The left and right correlation means each comprise a multiplier 2$g$, 2$d$ whose output is linked to a set 3$g$, 3$d$ of three correlation multipliers placed in parallel, whose outputs are linked to a correlation integrator 4$g$, 4$d$.

The integrators 4$g$, 4$d$ have the role of producing samples of demodulated, despread left $Z_{AG}$, $Z_{PG}$, $Z_{RG}$ (advance, punctual, delay) and right $Z_{AD}$, $Z_{PD}$, $Z_{RD}$ signal at low rate, for example, every 20 ms, at the software part 40 on the basis of the products at the output of the code demodulators formulated at high rate.

The term code demodulator designates the multiplier between a complex carrier-demodulated component received and a local code.

The term complex correlator designates the set formed by a code demodulator and an integrator 4$g$, 4$d$ with periodic resetting to zero. The resulting complex product is the despread demodulated signal received. Here we have three complex correlators per correlation pathway.

The hardware pathway 50 also comprises a code generation circuit 24 able to generate and to provide right advanced $C_{AD}$, punctual $C_{PD}$, delayed $C_{RD}$ and left advanced $C_{AG}$, punctual $C_{PG}$, delayed $C_{RG}$ local codes to the right D and left G correlation channels, on the basis of code commands CC and of carrier commands CP.

The code generation circuit 24 comprises a code phase digital integrator NCOc 18 controlled by speed code commands CC. The speed code commands are previously amplified by means of a speed code commands amplifier 67. The central-carrier speed commands CP are added to the code-speed commands by means of an adder 29, before the speed code commands amplifier 67. The carrier loop is said to help the code loop so as to reduce the trailing of the code loop due to dynamics, thereby making it possible to reduce the code loop band and therefore the noise in the measurement of the phase of the code for the pseudo-distance measurement.

The code phase digital integrator NCOc, 18 is able to generate a local code phase $\phi$codeL. It involves a digital integrator (without reset to zero) which produces the phase of the local code at high frequency (~100 MHz) on the basis of speed and jump commands updated by the software at low frequency (~50 Hz).

The code correlation circuit 24 comprises a local codes generator 19 controlled by the local code phase $\phi$codeL and providing right $C_{AD}$, $C_{PD}$, $C_{RD}$ and left $C_{AG}$, $C_{PG}$, $C_{RG}$ local code replicas to the respective right D and left G correlation channels.

The hardware pathway 50 furthermore comprises a carrier correlation circuit 25 able to generate and to provide and right Pld and left Plg local complex carriers, to the right D and left G correlation channels on the basis of the central carrier speed commands.

The commands, the replicas of the local codes and the local carriers are produced for each digital processing channel of index i but, for greater clarity, the index i of the satellite for these data is not indicated in the text of the patent application.

The carrier correlation circuit 25 comprises a local central carrier phase digital integrator NCOp 9 controlled by central carrier speed commands. The carrier commands CP are previously amplified by means of a second amplifier 8.

The local central carrier phase digital integrator NCOp 9 generates the local central carrier phase $\phi$pcL. The local sub-carrier phase $\phi$spL, obtained after amplification of the local code phase $\phi$codeL by means of a sub-carrier amplifier 22, is added to and simultaneously subtracted from the local central carrier phase $\phi$pcL to produce respectively two local carrier phases right φpDL and left φpGL. For this purpose, the hardware pathway 50 comprises a right adder 10 summing the local central carrier phase φpcL and the local sub-carrier phase φspL so as to obtain a right local carrier phase and a left subtracter 12 subtracting the local sub-carrier phase φspL from the local central carrier phase φpcL so as to obtain a left local carrier phase φpGL.

The hardware pathway 50 furthermore comprises right 11 and left 14 carrier generators, generating the right Plg and left Pld complex local carriers on the basis of the right φpDL and left φpGL local carrier phases. The local carriers thus produced are dispatched to the left and right correlation channels.

The code loop DLL comprises a code discriminator DSR, 26, making, on the basis of signals arising from the complex outputs of the left and right correlation pathways which are transmitted to it every 20 ms, estimations of the code error $\epsilon_{0i}$. The code discriminator provides the instantaneous estimations $\epsilon_{0i}$ of the code error to a code corrector CRC 15. The code corrector CRC, 15, uses these estimations to generate speed code commands CC every 20 ms. The code error $\epsilon_i$ for a satellite i represents the difference between the phase of the local code and that of the code of the signal received from the satellite of index i.

The central carrier phase loop PLL comprises a carrier discriminator DSP, 27 making, on the basis of signals arising from the complex punctual outputs of the right $ZS_{PD}$ and left $ZS_{PG}$ correlation pathways, an estimation of the central carrier phase error $\theta_{0i}$ and providing the latter to a central carrier corrector CRP, 7, generating central-carrier commands CP in the form of carrier speed.

The central carrier phase error $\theta_{0i}$ represents the difference between the phase of the central carrier of the signal received and the phase of the central carrier of the local signal.

The signals, arising from the complex outputs of the right $ZS_{AD}$, $ZS_{PD}$, $ZS_{RD}$ and left $ZS_{AG}$, $ZS_{PG}$, $ZS_{RG}$ correlation pathways, used by the carrier and code discriminators are here the complex outputs of the right $Z_{AD}$, $Z_{PD}$, $Z_{RD}$ and left $Z_{AG}$, $Z_{PG}$, $Z_{RG}$ correlation pathways.

The method of locating a mobile craft by radionavigation, described in the article cited previously, comprises a series of steps. First of all an energy-based search step is undertaken. The search phase consists in detecting the signal transmitted by the satellite of index i by searching for a correlation peak between the local signal and the signal received. In this search phase, the two components right and left of the signal received are demodulated in parallel by means of the hardware pathways 50 such as described previously by scanning, in open loop, several hypotheses about the phase of the code and about the frequency variation of the central carrier called the Doppler. The energy at the output of the correlators is measured. When an energy greater than a predetermined threshold is detected, then the signal is present.

The receiver thereafter undertakes a transition phase the object of which is to make the code converge towards the maximum of the envelope of the autocorrelation function in BPSK mode (namely the maximum of the envelope of the autocorrelation function of the BOC signal). For this purpose, the right and left components of the signal received are demodulated in parallel, in BPSK mode, by means of the hardware correlation pathway 50 and frequency and code loops, not represented, are closed. The frequency loop slaves the frequency of the local central carrier to the central carrier frequency of the signal received.

A phase of ambiguity resolution is carried out thereafter so as to make the code converge, in mode BPSK, onto the main peak of the BOC autocorrelation function of the signal received by means of the digital processing channel represented in FIG. 4.

The method of resolving ambiguity proposed in the aforementioned article is carried out in parallel on the signals arising from the various satellites in the digital processing channels such as previously described. For the signals originating from a satellite of index i, the following processing is carried out until the code loop converges:

The right and left components of the signal received are demodulated by a conventional BPSK demodulation method by means of the right and left channels. A code loop and a central carrier phase loop are closed so as to generate central-carrier commands and code commands after having made estimations of the code errors $\epsilon_{0i}$ and central carrier phase errors $\theta_{0i}$.

New local codes and new local central carriers for the two right and left local components are generated by means of the code generation 24 and central carrier 25 circuits on the basis of the central-carrier and code commands and BPSK mode demodulation is carried out again as long as the code loop has not converged.

The proposed method of resolving ambiguity comprises two successive steps. In a first step, the code loop is made to converge with a correlation circuit of tight correlator type until the standard deviation of the code error is less than a first code convergence threshold. On completion of this step the risk of false lock-on to a secondary peak still exists since the code error may despite everything be greater than half the distance between two peaks of the autocorrelation function of the BOC signal, because of the possible presence of multi-paths.

In a second step, the code loop is again made to converge, with a correlation circuit of Double Delta type. The code can then converge until the standard deviation of the code error is less than a second code convergence threshold. On completion of this step, the error in the code is assumed to be less than half the distance between two peaks, which is typically 5 m for a BOC signal generated by the Galileo system. The risk of false lock-on to a secondary peak, during the subsequent tracking phase, is markedly reduced.

On completion of the ambiguity resolution phase, a BOC mode tracking phase is entered, with a single correlation pathway and a single square local sub-carrier.

The satellite location system calculates pseudo-distances on the basis of code phase values arising from the tracking step.

The method of resolving ambiguity described exhibits the advantage of ensuring, with good robustness to multi-paths, that the nominal tracking is done on the main peak of the autocorrelation function.

However, the estimations $\epsilon_{0i}$ of the code errors on which the code corrector is based are noisy and biased by multi-paths, thereby inducing a non-negligible risk of false lock-on to a secondary peak. The consequence of this is to not ensure the integrity of the measurements of pseudo-distances and pseudo-speeds carried out by a location method based on a method of resolving ambiguity according to the prior art.

The aim of the invention is to remedy the aforementioned drawbacks.

SUMMARY OF THE INVENTION

For this purpose, the subject of the invention is a method of resolving ambiguity for determining the main peak of the autocorrelation function of signals transmitted by a set of satellites and received by a receiver of a radionavigation system, a signal received originating from a satellite comprising two received spectral components right and left spaced apart in frequency as well as a spreading code, a sub-carrier and a central carrier, the said method of resolving ambiguity being carried out in parallel for the signals originating from the various satellites by following the following steps:

the right and left components received are demodulated by a BPSK demodulation method in which right and left local components, comprising a respectively right and left local complex carrier and respectively right and left local codes, are correlated with the right and left components of the signal received so as to produce complex outputs of the right and left correlation pathways, the central carrier is tracked by means of a central carrier loop which calculates, on the basis of signals arising from the complex outputs of the right and left correlation pathways, estimations of central carrier phase errors so as to generate carrier commands, the code is tracked by means of a code loop which calculates, on the basis of signals arising from complex outputs of the right and left correlation pathways, instantaneous estimations of code errors so as to generate code commands, new right and left local complex carriers and new codes of the right and left local components are generated on the basis of the code commands and carrier commands, wherein the code commands are furthermore generated on the basis of instantaneous estimations of sub-carrier phase errors ($\Delta\phi_{0f}$), calculated on the basis of signals arising from the complex outputs of the right and left correlation pathways.

The method according to the invention can exhibit furthermore, one or more of the following characteristics taken together or separately:

the generation of the code commands is performed using a two-state Kalman filter adjusted on the basis of the instantaneous estimations of the code errors and of the instantaneous estimations of the sub-carrier phase errors, the signals arising from the complex outputs of the right and left correlation pathways are equal to the outputs of the right and left correlation pathways, the phase difference between the left and right components at the output of the correlation pathways is compensated by means of a filtered estimation of the sub-carrier phase error calculated on the basis of instantaneous estimations of sub-carrier phase errors and of instantaneous estimations of code errors so that the signals arising from the complex outputs of the right and left correlation pathways are outputs of the respectively right and left compensated correlation pathways, and a coherent tracking of the central carrier is carried out, after the step of generating the code commands and carrier commands:
  i. a local code phase, a local sub-carrier phase and a local central carrier phase are generated;
  ii. the compensation of the phase difference between the left and right components at the output of the correlation pathways is carried out by adding the filtered estimation of the sub-carrier phase error to the local sub-carrier phase, the compensation is carried out by differential complex rotation of the complex outputs of the right and left correlation pathways, the differential complex rotation applied being a rotation of a phase equal to the filtered estimation of the sub-carrier phase error, a pseudo-coherent tracking of the code is carried out, the correlation is carried out in a tight manner, it converges, for the signal originating from a satellite, when the standard deviation of the code error associated with this signal is less than a predetermined code threshold, the standard deviation being calculated on the basis of the covariance matrix of the Kalman filter, the convergence criterion is satisfied when furthermore a coherence criterion on the phase differential is satisfied, the coherence criterion being satisfied when, for a first number of satellites greater than or equal to a predetermined minimum satellite number, the deviation between the filtered estimation of the phase differential and the mean of these estimations averaged over the first number of satellites, is less than a predetermined phase differential threshold, it comprises an ambiguity resolution step carried out by means of the method according to any one of the preceding claims, the ambiguity resolution step is preceded by an energy-based search step and by a transition step, it furthermore comprises a tracking step starting, for a signal received originating from a satellite, when the ambiguity resolution method has converged for this signal, the tracking step is a reconstituted BOC mode tracking in which the phase differentials due to the analogue pathways are compensated by means of a common compensation the common compensation being initialized, at the commencement of the tracking phase, to the value of the mean of the filtered estimations of the phase differentials on completion of the ambiguity resolution phase, this mean being averaged over the first number Ns satellites complying with the convergence criterion, it comprises a step of calculating pseudo-distances during the ambiguity resolution step, it comprises a step of calculating pseudo-distances during the tracking step.

The subject of the invention is also a location receiver able to implement the method of resolving ambiguity according to the invention, the said receiver comprising analogue pathways, receiving and digitizing the signals originating from various satellites, as well as digital processing channels each being able to process the signals received from a satellite and originating from the analogue pathways, a digital processing channel comprising a hardware correlation pathway comprising:

right and left correlation channels able to independently demodulate two spectral components right and left of a signal received, the said correlation channels comprising correlation means for correlating the right and left spectral components of a signal received with the right and left local components of a signal produced locally so as to produce complex outputs of the right and left correlation pathways, a code correlation circuit comprising at least one code phase digital integrator NCOc, controlled by code and carrier commands, being able to generate local code phases controlling at least one local codes generator and providing right and left local codes to the respective right and left correlation channels, a carrier correlation circuit comprising generators of right and left carriers of the right and left local complex carriers on the basis of phases generated by at least one central carrier phase digital integrator, on the basis of at least some carrier commands, the right and left local complex carriers being provided to the right and left correlation channels, a digital processing channel furthermore comprising a software channel comprising a code loop and a central carrier phase loop, the code loop comprising a code discriminator DSR calculating, on the basis of signals arising from the complex outputs of the right and left correlation pathways instantaneous estimations of a code error, and providing these estimations to a code corrector CRC generating code commands, the central carrier phase loop comprising a carrier discriminator DSP calculating, on the basis of signals arising from the complex outputs of the right and left correlation pathways, estimations of a central carrier phase error and providing the latter to a carrier corrector CRP producing carrier commands, wherein the code loop furthermore comprises a sub-carrier phase discriminator DSSP calculating, on the basis of the signals arising from the complex outputs of the right and left correlation pathways, instantaneous estimations of a sub-carrier phase error these estimations being transmitted to the code corrector CRC which is embodied using a two-state Kalman filter adjusted on the basis of the instantaneous estimations of the code error and instantaneous estimations of the sub-carrier phase error.

The receiver according to the invention can exhibit furthermore, one or more of the following characteristics taken together or separately:

the signals arising from the complex outputs of the right and left correlation pathways are the outputs of the right and left correlation pathways, the carrier and code correlation circuit are of the tight correlator type, the code corrector CRC calculates, furthermore, a filtered estimation of the sub-carrier phase error and a digital correlation pathway comprises a compensation means able to compensate the phase difference between the left and right components at the output of the correlation pathways so as to provide the carrier discriminator DSP, code discriminator DSR and sub-carrier phase discriminator DSSP with signals arising from the complex outputs of the right and left correlation pathways which are outputs of the respectively right and left compensated correlation pathways, the said central carrier phase discriminator DSP carrying out a coherent summation of the outputs of the respectively right and left compensated correlation pathways before calculating the estimations of the central carrier phase errors.

the code discriminator DSR is of the pseudo-coherent type, the compensation means is embodied in the form of a compensator applying a differential complex rotation, of a phase equal to the filtered estimation of the sub-carrier phase error, to the complex outputs of the right and left correlation pathways so as to produce outputs of the respectively right and left compensated correlation pathways, the carrier correlation circuit comprises at least one central carrier phase digital integrator NCOp, controlled by at least some carrier commands, being able to generate central local carrier phases and to transmit them to at least one local codes generator and the hardware correlation pathway comprises a sub-carrier amplifier able to generate a local sub-carrier phase on the basis of the local code phase and a compensation means is embodied in the form of an adder adding the filtered estimation of the sub-carrier phase error to the local sub-carrier phase, the code correlation circuit comprises:

i. a code phase digital integrator NCOc producing a local code phase which is transmitted to at least one local codes generator, ii. a central carrier phase digital integrator generating a central local carrier phase by means of the carrier commands, iii. a right adder summing the central local carrier phase and the local sub-carrier phase so as to obtain a right local carrier phase, iv. a left subtracter subtracting the local sub-carrier phase from the central local carrier phase so as to obtain a left local carrier phase.

it comprises a local codes generator, it comprises a left local codes generator and a right local codes generator, it comprises a right code phase digital integrator and a left code phase digital integrator, a left local codes generator and a right local codes generator, a left central carrier phase digital integrator and right central carrier phase digital integrator.

BRIEF DESCRIPTION OF THE DRAWINGS

The present invention will be better understood on reading the detailed description of an embodiment, taken by way of nonlimiting example and illustrated by the appended drawing, in which.

DETAILED DESCRIPTION OF THE INVENTION

Figure 1:
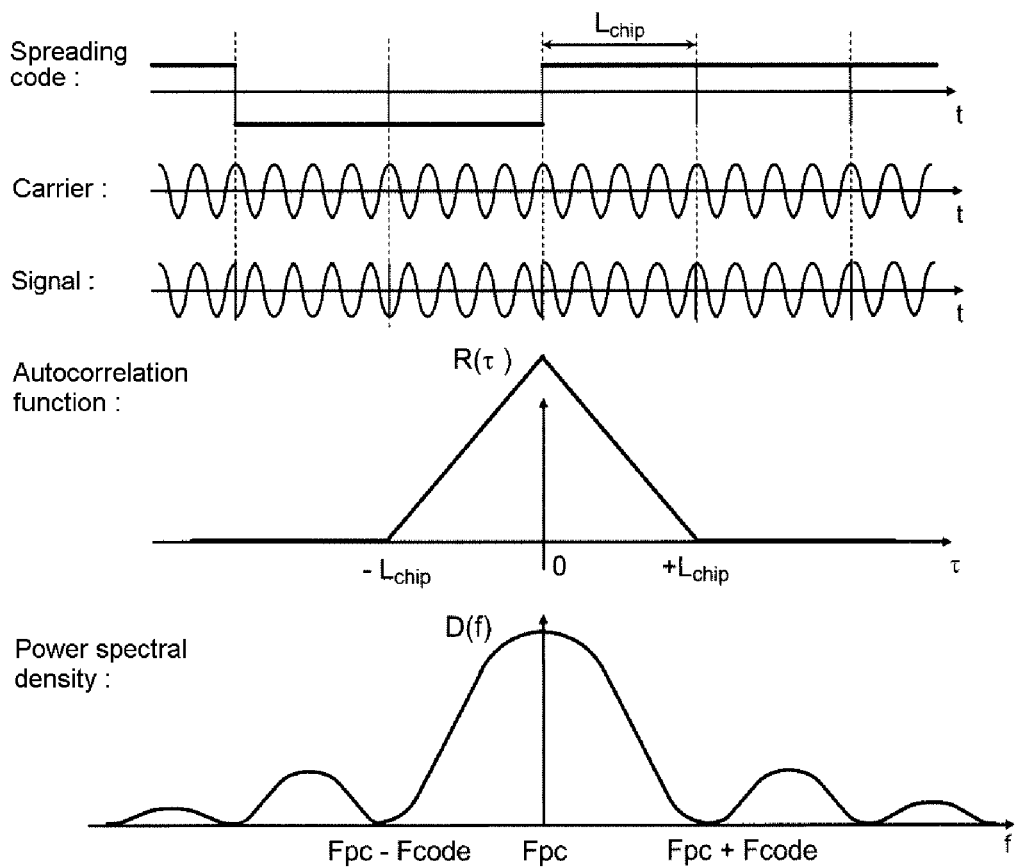
FIG. 1, already described, is a set of charts of defect-free signals received from a radionavigation satellite of the BPSK type, FIG. 2, already described, is a set of charts of defect-free signals received from a radionavigation satellite of the double carrier shift carrier type, FIGS. 3a and 3b, already described, are charts of signals of the type of those of FIG. 2, but bearing defects FIG. 4, already described, is a block diagram of a receiver, more particularly of a digital processing channel of a known radionavigation receiver
Figure 2:
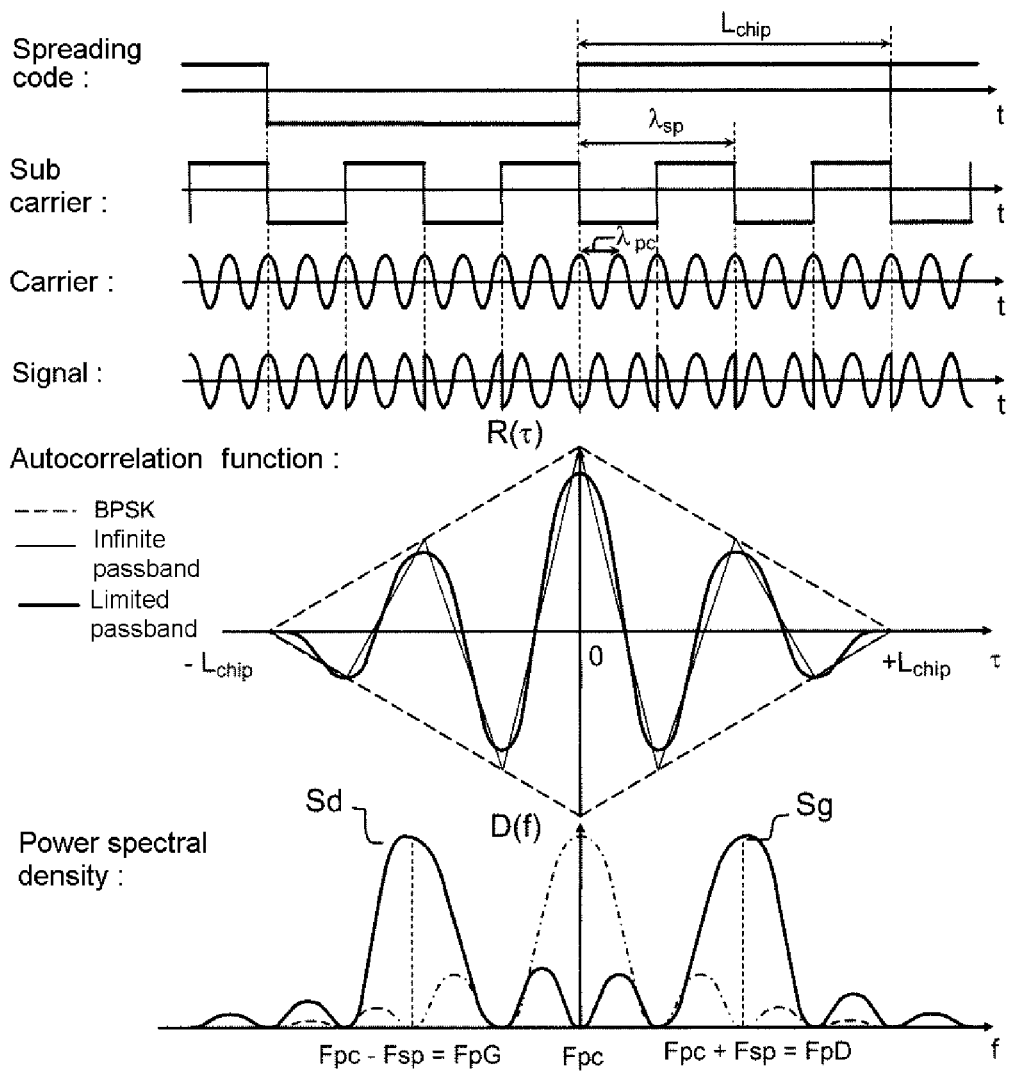
Figure 3A:
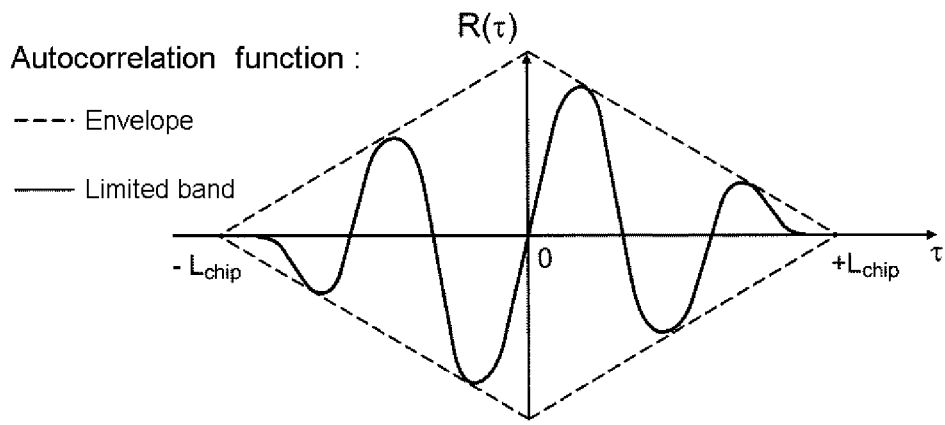
Figure 3B:
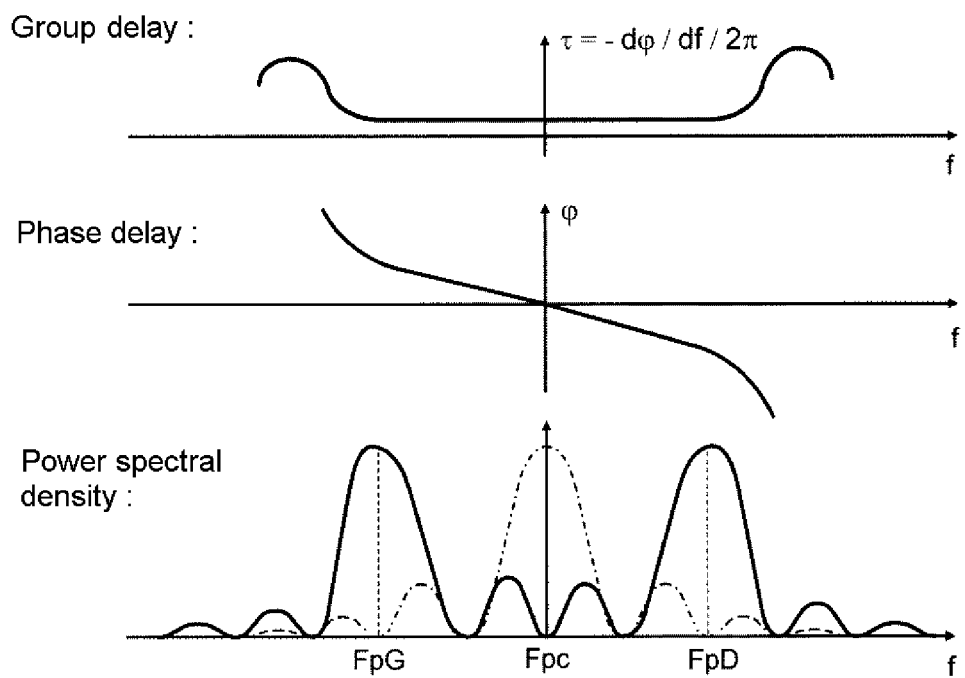

The invention is described below with reference to radionavigation signals originating from satellites, but of course it is not limited to this application alone and it may of course also be implemented when these signals originate from fixed satellites ("pseudolites", which is a contraction of "pseudo-satellite", that is to say terrestrial transmitters transmitting signals similar to those of the satellites) or mobile craft (aircraft, terrestrial vehicle, ship, etc.). Furthermore, the mobile craft comprising the radionavigation receiver of the satellite positioning system can just as well be an aircraft as a terrestrial vehicle or a ship.

The method of location of a receiver of a satellite positioning system comprises the same search and transition steps as the method according to the prior art before the ambiguity resolution step. On completion of the transition step, the variance in the code is typically less than 1 meter.

A step of resolving ambiguity is thereafter undertaken, carried out according to a method of resolving ambiguity according to the invention.

The method of resolving ambiguity differs from that of the prior art in that, for the channel of index i, the code commands CC are jump commands and are generated at one and the same time on the basis of instantaneous estimations of code errors $\epsilon_{0i}$ and on the basis of instantaneous estimations of the sub-carrier phase error $\Delta\phi_{0i}$ calculated on the basis of signals arising from the complex outputs of the right $ZS_{AD}$, $ZS_{PD}$, $ZS_{RD}$ and left $ZS_{AG}$, $ZS_{PG}$, $ZS_{RG}$ correlation pathways. More precisely, the generation of the commands of the code corrector is performed on the basis of a two-state Kalman filter adjusted on the basis of estimations $\epsilon_{0i}$ of the code error and estimations $\Delta\phi_{0i}$ of the sub-carrier phase error.

The sub-carrier phase error $\Delta\phi_i$ represents the deviation between the local sub-carrier phase and the sub-carrier phase received.

Half the difference between the phases of carriers of the left and right components of the signal received being, by definition, the sub-carrier phase received, then the sub-carrier phase error $\Delta\phi_i$ is equal to half the phase shift between the left and right components after demodulation by the left local and right local carriers. The left and right carrier phase errors $\Delta\phi_{PG}$, $\Delta\phi_{PD}$ (observable on the phases of the left and right components after demodulation at the output of the correlators) are as follows:

$$\Delta\phi_{PG}=\phi_{PG}-\phi_{PGL}$$

$$\Delta\phi_{PD}=\phi_{PD}-\phi_{PDL}$$

The phases of sub-carriers received $\phi_{sp}$ and local $\phi_{spL}$ are given by:

$$\phi_{sp}=(\phi_{PG}-\phi_{PD})/2$$

$$\phi_{spL}=(\phi_{PGL}-\phi_{PDL})/2$$

Hence:

$$\Delta\phi_i=\phi_{sp}-\phi_{spL}=(\Delta\phi_{PD}-\Delta\phi_{PG})/2$$

where $\phi_{sp}$, $\phi_{PG}$ and $\phi_{PD}$ are respectively the sub-carrier and carrier phases of the left and right components of the signal received.

For this purpose, the digital processing channels of a receiver according to the invention are modified with respect to a receiver of the prior art.

Figure 5:
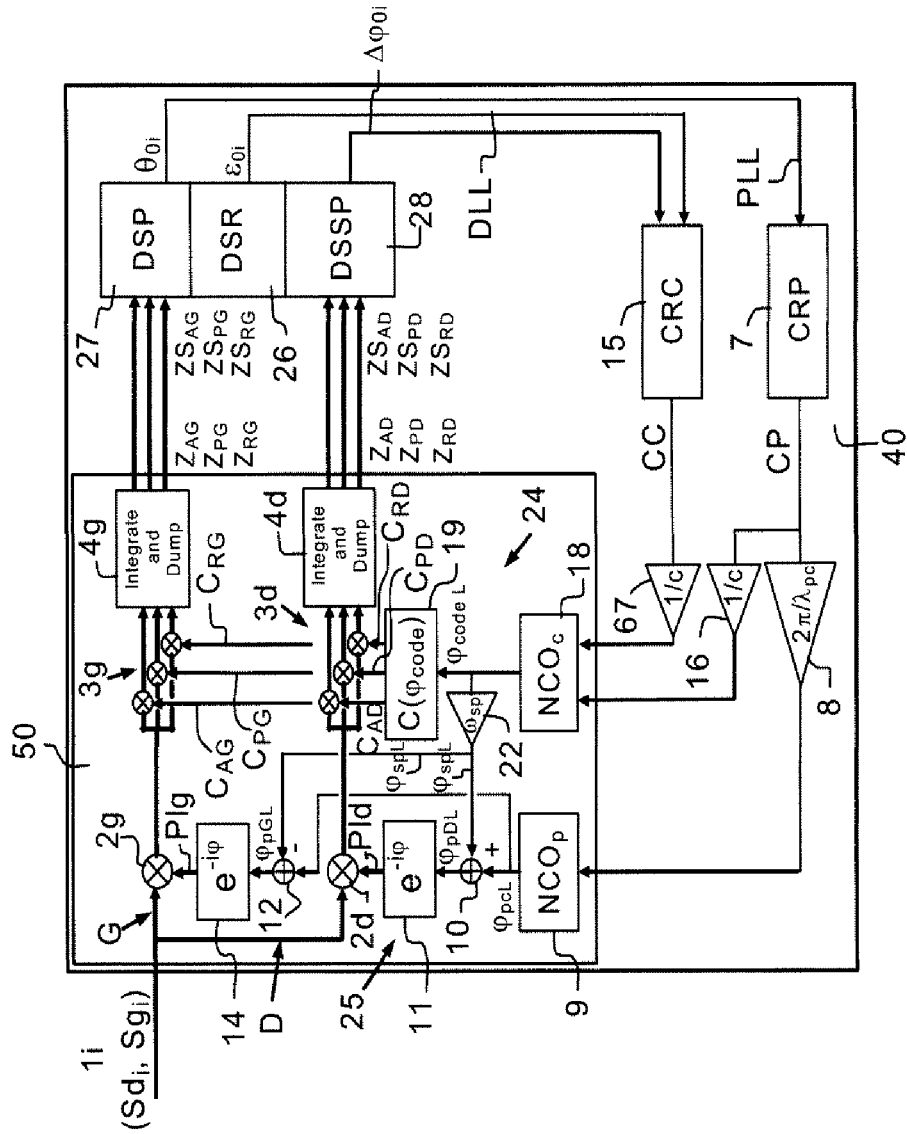
FIGS. 5, 6, 7, 10b and 11 are block diagrams of receivers, more particularly of digital processing channels of radionavigation receivers according to 5 different modes of the invention, able to implement the ambiguity resolution step of 5 different modes of the invention.

Represented in FIG. 5 is an exemplary block diagram of digital reception pathways of a receiver (one digital reception pathway per satellite received, this being also valid for the figures . . . ) of a GNSS signals receiver able to implement the ambiguity resolution step of the location method according to a first embodiment of the invention.

Figure 4:
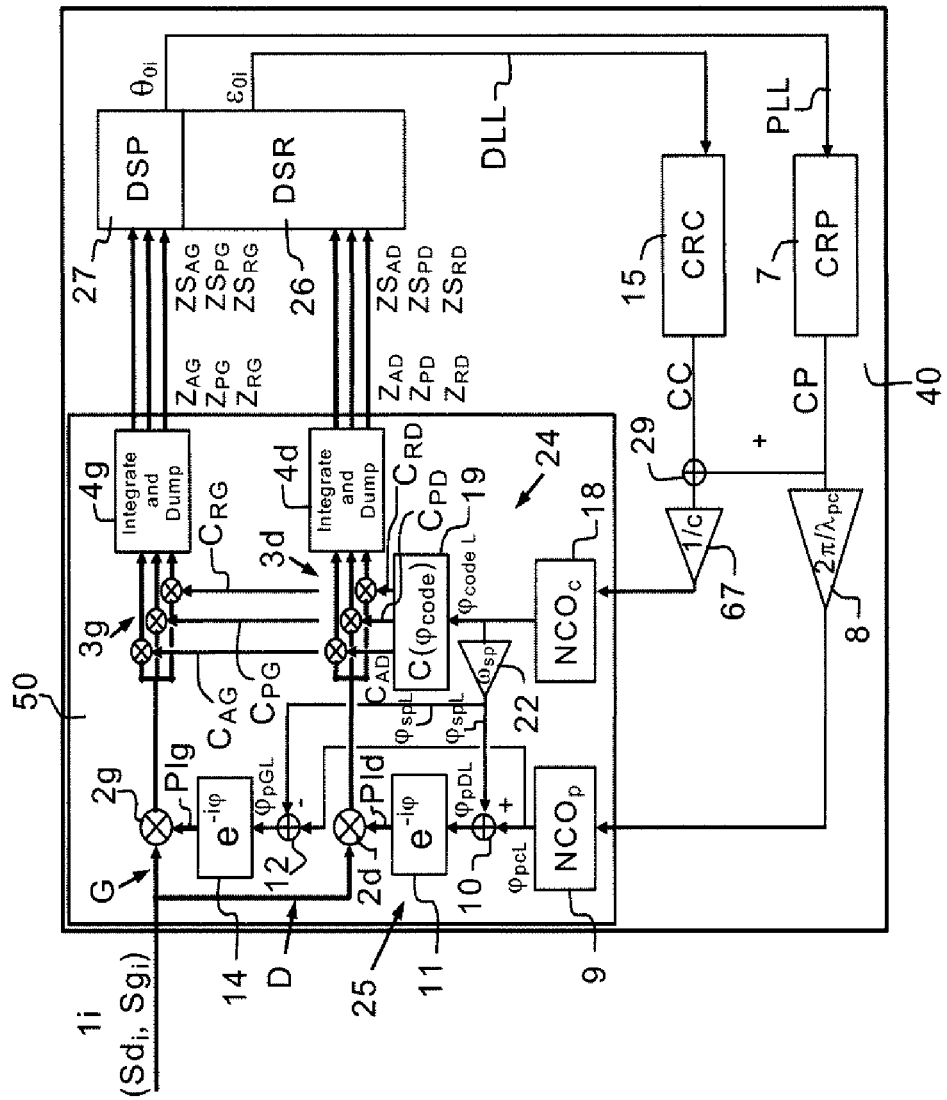

Elements common to the receivers of FIG. 4 and of FIG. 5 exhibit identical numerical references and will not be described again. The functions carried out by these various elements common to the prior art and to the ambiguity resolution step according to the invention will not be described again.

The software channel 40 of the receiver according to the invention has been modified.

In addition to a code discriminator DSR, 26, and a central carrier phase discriminator DSP, 27, the software channel 40 comprises a sub-carrier phase discriminator DSSP, 28. The sub-carrier phase discriminator DSSP, 28 calculates, on the basis of the signals arising from the punctual complex outputs of the right $ZS_{PD}$ and left $ZS_{PG}$ correlation pathways, instantaneous estimations $\Delta\phi_{0i}$ of the sub-carrier phase errors expressed in radians.

The instantaneous estimations $\Delta\phi_{0i}$ of the sub-carrier phase errors $\Delta\phi_i$ and the instantaneous estimations $\epsilon_{0i}$ of the code errors $\epsilon_i$ are transmitted, at the frequency of the integrator of the correlation circuit, to the code corrector CRC 15, which generates code commands.

The code corrector CRC 15 is embodied using a two-state Kalman filter adjusted on the basis of estimations $\epsilon_{0i}$ of the code errors and estimations $\Delta\phi_{0i}$ of the sub-carrier phase errors. The structure of the filter implies that it may be said that the code loop is aided by a sub-carrier phase loop.

The code loop corrector CRC, 15, is based on a Kalman filter with two states of which a first state $X_n(1)$ represents the phase differential $\delta\phi_i$ referred to distance units and a second state $X_n(2)$ represents the code error $\epsilon_i$, likewise expressed in distance units. The phase differential $\delta\phi_i$ is the phase differential induced by the analogue pathways on a signal received from a satellite of index i.

For a satellite of index i, the sub-carrier phase error $\Delta\phi_i$ is equal to the code error $\epsilon_i$ expressed in radians relative to the sub-carrier wavelength $\lambda_{sp}$ added to the phase differential $\delta\phi_i$.

$$\Delta\phi_i=(2\pi/\lambda_{sp})\cdot\epsilon_i+\delta\phi_i$$

The phase differential $\delta\phi_i$ is equal to half the phase shift induced by the analogue pathways of the receiver or of the satellite between the right and left components of the signal received. When the code error $\epsilon_i$ is zero, that is to say when the position of the local code is slaved to the energy maximum of the sum of the two signals arising from the complex outputs of left and right correlation pathways, the phase deviation $\Delta\phi_{PD}-\Delta\phi_{PG}$ between the two components left and right at the correlation pathways output is then equal to double the phase differential $\delta\phi_i$.

We shall now describe more precisely the calculations performed in the various blocks of the receiver according to the invention. In the subsequent description, we shall use the following notation:

*: conjugate $(Ae^{j\theta})^*=Ae^{-j\theta}$ arg: complex argument $\arg(Ae^{j\theta})=\theta$ Re: real part $Re(Ae^{j\theta})=A\cdot\cos(\theta)$ Im: imaginary part $Im(Ae^{j\theta})=A\cdot\sin(\theta)$ The state vector of the Kalman filter is defined in the following manner at the instant n:

$$X_n = \begin{bmatrix} X_n(1) \\ X_n(2) \end{bmatrix} \text{ (in meters)}$$

The state filter is initialized in the following manner:
Initialization of the State:

$$X_{0/0 corrected} = \begin{bmatrix} 0 \\ 0 \end{bmatrix}$$

Initialization of the Covariance Matrix:

$$P_{0/0} = \begin{bmatrix} \lambda_{sp}^2 & 0 \\ 0 & (\lambda_{code}/2)^2 \end{bmatrix}$$

The values of $\lambda_{sp}$ and $\lambda_{code}$ are initialized on the basis of the values calculated during the transition phase.

The Filter Propagates in the Following Manner:

$$F = \begin{bmatrix} 1 & 0 \\ 0 & 1 \end{bmatrix} \quad Q = \begin{bmatrix} 0 & 0 \\ 0 & q \end{bmatrix}$$

Propagation of the State:

$$X_{n/n-1} = F \cdot X_{n-1/n-1 \, corrected}$$

$X_{n-1/n-1 \, corrected}$ is the previous state after the code correction.

Adjustment of the Covariance Matrix:

$$P_{n/n-1} = F \cdot P_{n-1/n-1} \cdot F^T + Q$$

We shall now describe the calculations carried out by the discriminators in the first embodiment of the invention as a function of the signals arising from the complex outputs of the correlation pathways. In the first embodiment of the invention, the signals arising from the complex outputs of the right $ZS_{AD}$, $ZS_{PD}$, $ZS_{RD}$ and left $ZS_{AG}$, $ZS_{PG}$, $ZS_{RG}$ correlation pathways, used by the sub-carrier, carrier and code phase discriminators, are equal to the complex outputs of the right $Z_{AD}$, $Z_{PD}$, $Z_{RD}$ and left $Z_{AG}$, $Z_{PG}$, $Z_{RG}$ correlation pathways.

The sub-carrier phase discriminator DSSP, 28 and the code loop corrector CRC, 15, based at one and the same time on the instantaneous estimation of the code error $\epsilon_{0i}$ and the instantaneous estimation of the sub-carrier phase error $\Delta\phi_{0i}$, form a sub-carrier phase loop. The sub-carrier phase discriminator of a digital processing channel of index i, makes an estimation $\Delta\phi_{0i}$ of the sub-carrier phase error.

The sub-carrier phase discriminator, termed a "linear" sub-carrier phase discriminator, calculates an instantaneous estimation of half the phase difference between the two components right and left, on the basis of the signals arising from the punctual complex outputs of correlation pathways, in the following manner:

$$\Delta\phi_{0i} = \frac{1}{2} \cdot \arg_{]-\pi,\pi]}(ZS_{PD} \cdot ZS_{PG}^*)$$

The sub-carrier phase discriminator is, as a variant, a so-called "sine" discriminator, it calculates an instantaneous estimation of half the phase difference between the two components right and left in the following manner:

$$\Delta\phi_{0i} = \frac{1}{2} \cdot Im(ZS_{PD} \cdot ZS_{PG}^*)/(\|ZS_{PD}\| \cdot \|ZS_{PG}\|)$$

The sine discriminator is more robust to low C/N0 (signal-to-noise ratio), but should be used only if the code phase deviation between the two components is small, because of the non-linearity.

It is possible to use simultaneously, during the ambiguity resolution phase, a discriminator of the linear type and then a discriminator of the sine type, when the filter has already begun to converge, for example, when the code error is less than or equal to 1 m.

Variance of the Discriminator:

$$\sigma^2_{\epsilon\Delta\phi_{0i}} = \left(\frac{1}{C/N_0 \cdot T}\right)$$

T is the duration of integration in the integrators 4g, 4d. This time is typically 20 ms at 50 Hz.

In the code loop slaving the position of the local codes with that of the codes received, the code loop corrector CRC, 15, based on the Kalman filter, is adjusted via estimations of the sub-carrier phase error $\Delta\phi_{0i}$ in the following manner:

Observation:

$$Z_{sp} = \left(\frac{\lambda_{sp}}{2\pi}\right) \cdot \Delta\varphi_{0i}$$

Variance of the Observation:

$$r_{sp} = \left(\frac{\lambda_{sp}}{2\pi}\right)^2 : \sigma_{\Delta\varphi_{0i}}$$

Innovation:

$$Y_{sp}' = Z_{sp} - H_{sp} X_{n/n-1}$$

$$Y_{sp} = \text{modulo}_{1/2\lambda_{sp}}(Y_{sp}' + \tfrac{1}{4}\lambda_{sp}) - \tfrac{1}{4}\lambda_{sp}$$

Observation Matrix:

$$H_{sp} = [1\,1]$$

Adjustment Gain:

$$K_{sp} = P_{n/n-1} \cdot H_{sp}(H_{sp} \cdot P_{n/n-1} \cdot H_{sp}^T + r_{sp})^{-1}$$

Adjustment of the State:

$$X_{n/nsp} = X_{n/n-1} + K_{sp} \cdot Y_{sp}$$

Adjustment of the Covariance Matrix:

$$P_{n/nsp} = (I - K_{sp} H_{sp}) P_{n/n-1}$$

The code discriminator DSR, 26, calculates an estimation $\epsilon_{0i}$ of the code error $\epsilon_i$, expressed in meters, representative of the shift between the position of the local code and of the code of the signal received in the following manner:

$$\epsilon_{0i} = \{Re[ZS_{AG} \cdot ZS_{PG}^*] + Re[ZS_{AD} \cdot ZS_{PD}^*]\}/\mu$$

With:

$\mu$, the slope of the discriminator

Prior to the calculation of the instantaneous estimation $\epsilon_{0i}$ of the code error $\epsilon_i$, the discriminator has carried out a subtraction between the advance and delay pathways which is performed on the advance and delay complex outputs of the left and right correlation channels.

$$ZS_{AG} = ZS_{AG} - ZS_{RG}$$

$$ZS_{AD} = ZS_{AD} - ZS_{RD}$$

As a variant, the subtraction between the advance and delay pathways is carried out on the advance and delay codes in the right and left correlation channels, so that the signals, arising from the complex outputs of the correlation pathways (which are the complex outputs of the correlation pathways), are directly equal to the left and right subtractions $ZS_{AG}$, $ZS_{AD}$.

In this embodiment, the code discriminator is said to be non-coherent since a non-coherent sum of the advance and delay pathways is carried out prior to the calculation of the code error. Non-coherent tracking of the code is therefore carried out during the ambiguity resolution phase.

The variance of the discriminator is as follows:

$$\sigma^2_{\varepsilon code} = \left(\frac{\lambda_{code}}{\mu}\right)^2 \left(\frac{v}{2 \cdot C/N_0 \cdot T}\right)$$

μ=slope of the discriminator
υ: parameter of the discriminator

The Kalman filter takes into account the instantaneous estimations of the code error $\varepsilon_{0i}$, calculated by the code discriminator, in the following manner:

Observation:

$$Z_{code} = \varepsilon_{0i}$$

Variance of the Observation:

$$r_{code} = \sigma^2_{\varepsilon code}$$

Observation Matrix:

$$H_{code} = [0\ 1]$$

Adjustment Gain:

$$K_{code} = P_{n/nsp} \cdot H_{code} (H_{code} \cdot P_{n/nsp} \cdot H_{code}^T + r_{code})^{-1}$$

Adjustment of the State:

$$X_{n/n} = X_{n/nsp} + K_{code}(Z_{code} - H_{code} X_{n/nsp})$$

Adjustment of the Covariance Matrix:

$$P_{n/n} = (I - K_{code} H_{code}) P_{n/nsp}$$

The carrier discriminator DSP, 27 is, in a first embodiment, of the "arctangent" type and calculates an estimation of the central carrier phase error $\theta_{0i}$ in the manner described below.

It calculates first of all an estimation of the central carrier phase error on the right $\theta_{0iD}(n)$ and left $\theta_{0iG}(n)$ components and then works out the mean of these estimations to obtain the estimation of the central carrier phase error of the signal received.

$$\theta_{0iG}(n) = \arg_{]-\pi,\pi]}(Z_{PG}(n))$$

$$\theta_{0iD}(n) = \arg_{]-\pi,\pi]}(Z_{PD}(n))$$

$$\theta_{0i}(n) = (\theta_{0iG}(n) + \theta_{0iD}(n))/2$$

In a second embodiment, the discriminator is of the "Winder" or "Extended" type. It also computes a mean of the estimations of the phase errors on the right $\theta_{0iD}(n)$ and left $\theta_{0iG}(n)$ components, the calculation of the phase errors on the right and left components being carried out differently.

$$\Delta\theta_{0iG}(n) = \arg_{]-\pi,\pi]}(ZS_{PG}(n) \cdot ZS_{PG}(n-1)^*)$$

$$\Delta\theta_{0iD}(n) = \arg_{]-\pi,\pi]}(ZS_{PD}(n) \cdot ZS_{PD}(n-1)^*)$$

$$\theta_{0iG}(n) = \theta_{0iG}(n-1) + \Delta\theta_{0iG}(n)$$

$$\theta_{0iD}(n) = \theta_{0iD}(n-1) + \Delta\theta_{0iD}(n)$$

$$\theta_{0i}(n) = (\theta_{0iG}(n) + \theta_{0iD}(n))/2$$

In these embodiments, the carrier phase discriminator is said to be non-coherent since it does not carry out, prior to the calculation of the central carrier phase error, a coherent sum of the complex outputs of the left and right correlation pathways. Non-coherent tracking of the central carrier phase is therefore carried out during the ambiguity resolution phase.

The code corrector CRC 15 generates code commands CC, so as to produce a new local signal reducing the code error.

First of all, the code corrector calculates a correction to be made to the code Correction code phase (n) defined in the following manner:

Code correction $(n) = X_{n/n}(2)$ $$X_{n/ncorrected} = X_{n/n} - \begin{bmatrix} 0 \\ \text{Code correction} \end{bmatrix}$$

The code commands CC generated by the code corrector CRC 15 are code jump commands Scode.

CC (n)=Scode (n)=Code correction (n), expressed in meters.

The carrier corrector CRP, 7, produces carrier commands CP which are speed commands.

First of all, the carrier corrector CRP, 7, does the following calculations:

$$\begin{cases} A_{carrier}(n+1) = A_{carrier}(n) + T \cdot K3_{carrier} \cdot \theta_{0i}(n) \\ V_{carrier}(n+1) = V_{carrier}(n) + T \cdot A_{carrier}(n) + T \cdot K2_{carrier} \cdot \theta_{0i}(n) \\ C_{carrier}(n+1) = T \cdot V_{carrier}(n) + T \cdot K1_{ccarrier} \cdot \theta_{0i}(n) \end{cases}$$

The carrier speed commands CP are defined as follows:

$$CP(n) = C_{carrier}(n+1)/T (m/s)$$

The CRC carrier corrector, 7, transmits the carrier speed commands CP to the central carrier phase digital integrator NCOp 9 via an amplifier 8 which amplifies the commands by $2\pi/\lambda_{pc}$.

The carrier corrector also transmits the carrier speed commands CP to the code phase digital integrator NCOc 18 via an amplifier 16 which amplifies the carrier commands by 1/c so that the carrier loop aids the code loop.

An amplifier 17 amplifies the code jump commands by 1/c.

The fact of using, in the code loop, a Kalman filter adjusted via a sub-carrier discriminator makes it possible to compensate the divergence between the phase of the code and that of the central carrier phase. Indeed, in a prior art method as described with reference to FIG. 4, the code loop is aided by the central carrier phase loop and the code corrector averages the instantaneous estimations of the code error which are provided to it every 20 ms so as to reduce the noise in these estimations and provide code commands for correcting the local codes.

Now, on account of the propagation of the signal transmitted by a satellite in the ionosphere, the phase of the code and the phase of the central carrier diverge since the phase delay of the central carrier, induced by the ionosphere, is different from the phase delay induced between the right and left components.

It is therefore necessary to integrate the estimations of the code error over limited times (of the order of a minute) in the code corrector, otherwise the local code aided by the central carrier diverges with respect to the code received. The phase of the local code is noisy and the risks of false lock-on to a secondary peak in tracking mode are non-negligible on account of the integration over a limited time.

The phase of the sub-carrier received and the phase of the code received not exhibiting any divergence due to ionospheric effects, the fact of aiding the code loop by means of the sub-carrier loop, in the Kalman filter, makes it possible to compensate the divergence between the code and the carrier phase. Thus in the short term the phase of the local code follows the movements in the sub-carrier phase measurement, which is precise but ambiguous, and in the long term it converges towards the maximum of the means of the Left and Right autocorrelation functions obtained after BPSK demodulation. The Kalman filter can therefore trust the aid of the sub-carrier to average the estimations of the code errors over a very long time well beyond a minute without being disturbed by the divergence of the central carrier phase. This very long filtering time makes it possible to average the code errors due to thermal noise and to multi-paths. Thus the standard deviation of the code error decreases as the filter garners measurements, until it becomes small enough to allow a switch to reconstituted BOC tracking on the correct peak, without false lock-on.

This makes it possible to limit the risks of false lock-on and the risks of dropouts on switching to the tracking phase and to improve the precision of the measurements of pseudo-distances.

In a second preferential embodiment of the ambiguity resolution step according to the invention, during the step of generating the code commands, a filtered estimation $\Delta\phi_{ifiltered}$ of the sub-carrier phase error is calculated for a satellite of index i, and the phase difference between the left and right components at the output of the correlation pathways, which is equal to double the sub-carrier phase error $\Delta\phi_i$, is compensated.

The filtered estimation $\Delta\phi_{ifiltered}$ of the sub-carrier phase error is obtained by summing the filtered estimation $\epsilon_{i\,filtered}$ of the code error, expressed in radians, relative to the sub-carrier wavelength $\lambda_{SP}$, and of the filtered estimation $\delta\phi_{i\,filtered}$ of the phase differential, provided by the Kalman filter:

$$\Delta\phi_{ifiltered} = (2\pi/\lambda_{SP}) \cdot \epsilon_{ifiltered} + \delta\phi_{ifiltered}$$

$$\epsilon_{ifiltered} = X_{n/n}(2)$$

$$\delta\phi_{ifiltered} = (2\pi/\lambda_{SP}) \cdot X_{n/n}(1)$$

In a first variant of this embodiment, the phase difference between the two components left and right is compensated between the step of generating the code commands and the step of generating the new right Plg and left Pld local complex carriers and replicas of the right $C_{AD}$, $C_{PD}$, $C_{RD}$ and left $C_{AG}$, $C_{PG}$, $C_{RG}$ local codes.

Figure 6:
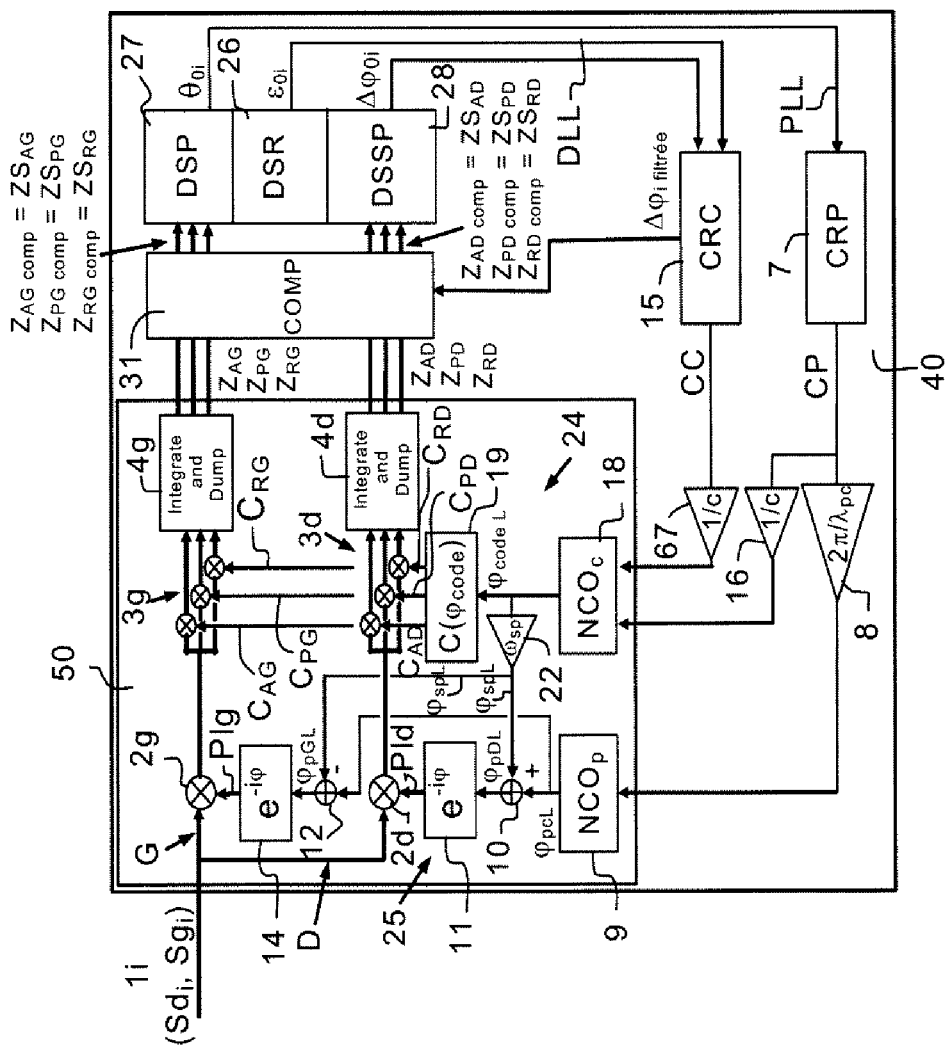

Represented in FIG. 6 is an exemplary block diagram of a digital reception channel of a GNSS signals receiver able to implement the ambiguity resolution step according to the second embodiment of the invention.

Elements common to the receivers of FIG. 5 and of FIG. 6 exhibit identical numerical references and will not be described again. The functions carried out by these various elements common to the prior art and to the ambiguity resolution step according to the invention will not be described again.

The code loop corrector CRC, 15, makes a filtered estimation of the sub-carrier phase error $\Delta\phi_i$ on the basis of the instantaneous estimations of the code error and sub-carrier error. The estimation $\Delta\phi_{ifiltered}$ is said to be a filtered estimation since the Kalman filter averages the estimations of the code error and sub-carrier phase error provided by the discriminators every 20 ms before providing the filtered estimation of the sub-carrier phase error. This makes it possible to filter the biases in the estimations of the code error and sub-carrier phase error due to multi-paths and to thermal noise.

The code loop corrector makes a filtered estimation of the sub-carrier phase error of a satellite of index i in the following manner:

$$\Delta\varphi_{ifiltered} = \left(\frac{2\pi}{\lambda_{sp}}\right) \cdot H_{sp} \cdot X_{n/nsp}.$$

The receiver comprises a means for compensating the phase difference between the right and left components at the output of the correlation pathways. The compensation means is a compensator COMP, 31, receiving the filtered estimation $\Delta\phi_{i\,filtered}$ of the sub-carrier phase error as well as the complex outputs of the right $Z_{AD}$, $Z_{PD}$, $Z_{RD}$ and left $Z_{AG}$, $Z_{PG}$, $Z_{RG}$ correlation pathways. The compensator uses the differential complex rotation scheme to do the compensation by differential complex rotation of a phase equal to the estimation of the sub-carrier phase difference.

Outputs of the respectively right $Z_{ADcomp}$, $Z_{PDcomp}$, $Z_{RDcomp}$ and left $Z_{AGcomp}$, $Z_{PGcomp}$, $Z_{RGcomp}$ compensated correlation pathways are thus obtained at the input of the discriminators. These values are calculated for each channel of index i. For greater clarity, no index i is placed on these values.

$$Z_{AGcomp} = e^{+j\Delta\phi_{ifiltered}} \cdot Z_{AG} \quad Z_{ADcomp} = e^{-j\Delta\phi_{ifiltered}} \cdot Z_{AD}$$

$$Z_{PGcomp} = e^{+j\Delta\phi_{ifiltered}} \cdot Z_{PG} \quad Z_{PDcomp} = e^{-j\Delta\phi_{ifiltered}} \cdot Z_{PD}$$

$$Z_{RGcomp} = e^{+j\Delta\phi_{ifiltered}} \cdot Z_{RG} \quad Z_{RDcomp} = e^{-j\Delta\phi_{ifiltered}} \cdot Z_{RD}$$

At the output of the compensator COMP, the signals arising from the complex outputs of the right $ZS_{AD}$, $ZS_{PD}$, $ZS_{RD}$ and left $ZS_{AG}$, $ZS_{PG}$, $ZS_{RG}$ correlation pathways are equal respectively to the right $Z_{ADcomp}$, $Z_{PDcomp}$, $Z_{RDcomp}$ and left $Z_{AGcomp}$, $Z_{PGcomp}$, $Z_{RGcomp}$ compensated complex outputs.

These outputs are transmitted to the code discriminator DSR, 26, carrier phase discriminator DSP, 27, and sub-carrier phase discriminator DSSP, 28 so as to estimate the respective code error, central carrier phase error and sub-carrier phase error.

This embodiment exhibits the advantage of not necessitating any modification of the hardware pathways 50 of the digital pathways of the receiver with respect to the embodiment represented in FIG. 5.

As a variant, the compensation for a satellite i is carried out between the step of generating the code commands CC and central carrier corrector commands CP and the step of generating the new right Plg and left Pld complex local carriers. The compensation means is, in this variant, an adder 36 adding the filtered estimation $\Delta\phi_{i\,filtered}$ of the sub-carrier phase error to the local sub-carrier phase, obtained by amplifying, by the sub-carrier angular frequency $\omega$sp, the local code phase with an amplifier 22.

Figure 7:
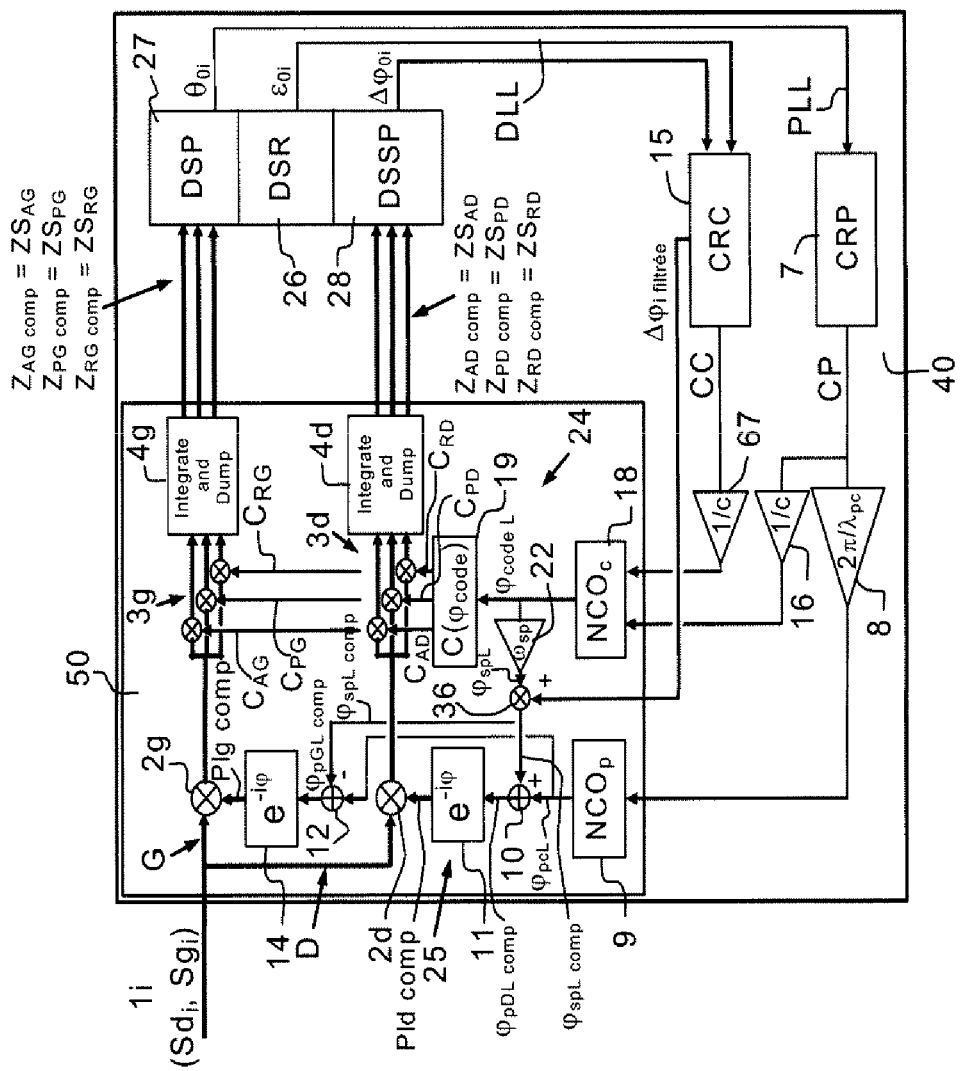

Represented in FIG. 7 is an exemplary block diagram of digital reception pathways of a GNSS signals receiver (one digital reception pathway per satellite received) able to implement the ambiguity resolution step according to a variant of the second embodiment of the invention.

Elements common with FIG. 5 comprise the same numerical references and will not be described again.

The code loop corrector CRC, 15 provides a filtered estimation $\Delta\phi_{i\,filtered}$ of the sub-carrier phase error $\Delta\phi i$ to an adder 36 which adds this estimation to the local sub-carrier phase.

The compensated local sub-carrier phase $\phi$spLcomp is transmitted to the right 10 and left 13 adders which deduct it from and respectively add it to the central carrier phase generated by the central carrier phase digital integrator NCOp, 9 so as to obtain left $\phi$pGLcomp and right $\phi$pDLcomp compensated local carrier phases and to produce left and right compensated local carriers Plgcomp and Pldcomp.

Thus, the complex outputs of the correlation pathways in the variant of the second embodiment of the invention, the signals arising from the complex outputs of the right $ZS_{AD}$, $ZS_{PD}$, $ZS_{RD}$ and left $ZS_{AG}$, $ZS_{PG}$, $ZS_{RG}$ correlation pathways are equal respectively to the right $Z_{ADcomp}$, $Z_{PDcomp}$, $Z_{RDcomp}$ and left $Z_{AGcomp}$, $Z_{PGcomp}$, $Z_{RGcomp}$ compensated complex outputs.

Sub-Carrier Phase Loop:

The sub-carrier phase discriminator DSSP, 28 of the linear type carries out the instantaneous estimation of the sub-carrier phase error $\Delta\phi_{0i}$ on the basis of the compensated punctual complex outputs of correlation pathways and of the filtered estimation of the sub-carrier phase error in the following manner:

$$\Delta\phi_{0i} = \frac{1}{2} \cdot \arg_{]-\pi,\pi]}(Z_{PDcomp} \cdot Z_{PGcomp}^*) + \Delta\phi_{ifiltered}$$

The sub-carrier phase discriminator of the "sine" type carries out the instantaneous estimation of the sub-carrier phase error $\Delta\phi_{0i}$ in the following manner:

$$\Delta\phi_{0i} = \frac{1}{2} \cdot Im(Z_{PDcomp} \cdot Z_{PGcomp}^*)/(\|Z_{PDcomp}\| \cdot \|Z_{PGcomp}\|) + \Delta\phi_{ifiltered}$$

Central Carrier Phase Loop:

Prior to the calculation of the estimation of the central carrier phase error $\theta_{0i}$, the punctual outputs of the compensated right and left correlation pathways are summed in a coherent manner. The central carrier phase discriminator is said to be coherent. It is the fact of compensating the phase difference between the two components right and left which allows us to carry out a coherent summation of the two correlation pathways. If this compensation were not done there would be a risk of destructively summing the complex outputs of the left and right pathways and of degrading the signal-to-noise ratio or indeed of losing the satellite signal.

The coherent sum $Z_{P\ coherent}$ of the outputs of the compensated punctual correlation pathways is carried out in the following manner:

$$Z_{Pcoherent}(n) = Z_{PGcomp}(n) + Z_{PDcomp}(n)$$

The calculation of the estimation of the carrier phase error is thereafter carried out, on the basis of the coherent sum $Z_{Pcoherent}$ of the outputs of the compensated punctual correlation pathways, in the following manner:

BPSK Discriminator:

$\theta_{0i}(n) = \arg_{]-\pi,\pi]}(Z_{Pcoherent}(n))$ if the signal is not modulated by data (pilot pathway)

$\theta_{0i}(n) = \arg_{]-\pi/2,\pi/2]}(Z_{Pcoherent}(n))$ if the signal is modulated by data DBPSK or "Winder" or "Extended" Discriminator:

$\Delta\theta_{0i}(n) = \arg_{]-\pi,\pi]}(Z_{Pcoherent}(n) \cdot Z_{Pcoherent}(n-1)^*)$ if the signal is not modulated by data (pilot pathway)

$\Delta\theta_{0i}(n) = \arg_{]-\pi/2,\pi/2]}(Z_{Pcoherent}(n) \cdot Z_{Pcoherent}(n-1)^*)$ if the signal is modulated by data $\theta_{0i}(n) = \theta_{0i}(n-1) + \Delta\theta_{0i}(n)$ A central carrier phase loop comprising a coherent phase discriminator, carries out coherent tracking of the central carrier of the BPSK mode demodulated signal.

The coherent tracking of the central carrier phase in the ambiguity resolution step makes it possible to render the central carrier phase loop more robust to noise or to interference.

Figure 8:
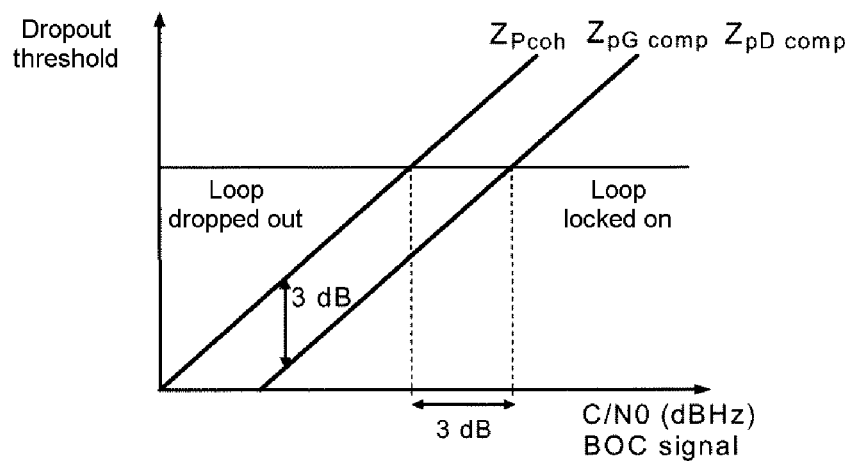
FIG. 8 represents the dropout threshold of the central carrier loop as a function of the signal-to-noise ratio of the signal received.

Represented in FIG. 8 is the dropout threshold of the central carrier loop as a function of the signal-to-noise ratio C/N0 of the BOC signal transmitted by a satellite.

The power of the satellite signal is split half on the left component and half on the right component. The signal-to-noise ratio is therefore 3 dB lower on the punctual complex outputs of the left and right correlation pathways, compensated or not, with respect to the coherent sum of these complex outputs.

Now, the dropout threshold of the carrier phase loop is given by a minimum signal-to-noise ratio on the left and right punctual complex outputs for the non-coherent discriminator, and on the coherent sum of these complex outputs, for the coherent discriminator.

As a result, the loop sustain threshold is degraded by 3 dB in the case where a non-coherent carrier discriminator is used, with respect to the case where a coherent carrier discriminator is used. This results in better continuity of service in a hostile or disturbed environment.

Code Loop:

The code discriminator is of the non-coherent type as described in the first embodiment of the invention.

As a variant, the code discriminator of the code loop is of the pseudo-coherent type. A pseudo-coherent code discriminator first of all carries out the advance and delay pathways coherent sum by summing the compensated punctual complex outputs of the right and left correlation channels.

As a variant, the subtraction between the advance and delay pathways is carried out on the advance and delay codes in the right and left correlation channels, so that the signals, arising from the complex outputs of the correlation pathways (which are the complex outputs of the correlation pathways), are directly equal to the left and right subtractions $ZS_{\Delta G}$, $ZS_{\Delta D}$.

More precisely, a subtraction of the compensated advance and delay complex outputs $Z_{\Delta G\ comp}$, $Z_{\Delta D\ comp}$ is calculated first of all in parallel for the right and left correlation channels:

$$Z_{\Delta Gcomp} = Z_{AGcomp} - Z_{RGcomp}$$

$$Z_{\Delta Dcomp} = Z_{ADcomp} - Z_{RDcomp}$$

A coherent sum $Z_{\Delta coherent}$ of the subtractions of the left $Z_{\Delta G\ comp}$ and right $Z_{\Delta D\ comp}$ compensated advance and delay complex outputs as well as a coherent sum $Z_{P\ coherent}$ of the outputs of the compensated punctual correlation pathways are thereafter calculated in the following manner:

$$Z_{\Delta coherent} = Z_{\Delta Gcomp} + Z_{\Delta Dcomp}$$

$$Z_{Pcoherent} = Z_{PGcomp} + Z_{PDcomp}$$

Thereafter, the pseudo-coherent code discriminator calculates the code error $\epsilon_{0i}$.

$$\epsilon_{0i} = \{Re[Z_{\Delta coherent} \cdot Z_{Pcoherent}^*]\}/\mu$$

The pseudo-coherent code discriminator exhibits the advantage of being less noisy than the non-coherent code discriminator.

In the embodiments represented in FIGS. 5 to 7, the code and central carrier digital correlation pathways are of the tight correlator type so as to produce complex outputs of the left and right $Z_{AD}$, $Z_{PD}$, $Z_{RD}$ and left $Z_{AG}$, $Z_{PG}$, $Z_{RG}$ advance, delay and punctual correlation pathways.

In these correlation pathways, the local codes generator 19 produces local replicas of the spreading code for the right Advance $C_{AD}$ and Delay $C_{RD}$ local component respectively in advance and delayed by a lag d with respect to the Punctual component $C_{PD}$. The same holds for the replicas of the spreading code for the left local component.

As a variant, the digital correlation pathways are of the "Double Delta" type so as to produce complex outputs of the correlation pathways that are greatly advanced, advance, delay, greatly delayed and punctual $Z_{TAD}$, $Z_{AD}$, $Z_{PD}$, $Z_{RD}$, $Z_{TRD}$ and left $Z_{TAG}$, $Z_{AG}$, $Z_{PG}$, $Z_{RG}$, $Z_{TRG}$. The greatly advanced and greatly delayed pathways are shifted by a lag equal to 2·d with respect to the punctual component.

In the case of the Double Delta correlator, the sub-carrier and carrier phase discriminator are unchanged with respect to the previous embodiments.

In the code discriminator, it is the subtraction of the compensated advance and delay complex outputs $Z_{\Delta Gcomp}$, $Z_{ADcomp}$ that is modified with respect to the embodiment based on a correlator of tight type.

The two subtractions are calculated in the following manner:

$$Z_{\Delta Gcomp} = -Z_{TAGcomp} + 2 \cdot Z_{AGcomp} - 2 \cdot Z_{RGcomp} + Z_{TRGcomp}$$

$$Z_{\Delta Dcomp} = -Z_{TADcomp} + 2 \cdot Z_{ADcomp} - 2 \cdot Z_{RDcomp} + Z_{TRDcomp}$$

A Double Delta correlator makes it possible to limit the closed-loop code error in BPSK mode to 3 m, a value less than the distance between two peaks (i.e. 5 m). When the loop has converged the residual code error is therefore compatible with a tracking on the correct main peak of the autocorrelation function. The use of a Double Delta correlator therefore makes it possible to reduce multi-path errors.

In a preferential mode of the invention, the correlator is, initially, of the tight correlator type and, when the variance of the estimation of the code error is less than a predetermined threshold, a Double Delta correlator is used. The use of a tight correlator initially makes it possible to reduce the code error enough to be in the Double Delta's capture span.

The receiver embodiments in which the compensator is embodied in the form of an adder (see FIG. 7) or in which there is no compensator as represented (in FIG. 5) are also adaptable to the Double Delta correlator.

The steps of the method of resolving ambiguity are repeated until a predetermined convergence criterion for the code loop is satisfied. Once the convergence criterion is satisfied, we switch to a reconstituted BOC mode tracking phase.

The convergence criterion is satisfied when the standard deviation of the error of the code estimated by the code corrector is less than a predetermined code threshold Threshold$_{code}$. The switch to tracking is made independently for the digital processing channels of the various satellites.

Standard Deviation of the Code Error

The standard deviation of the code error is calculated on the basis of the covariance matrix of the Kalman filter $$\sigma_{code\, i} = \sqrt{P_{n/n}(2,2)}$$

$$\text{Threshold}_{code} = \lambda_{code}/20$$

As a variant, a second convergence criterion which combines a criterion based on the code error and a coherence criterion is defined. The second convergence criterion is satisfied when the first convergence criterion is satisfied and when the coherence criterion is satisfied for a predetermined number of satellites. The switch to tracking mode is made at the same time for the channels of all the satellites satisfying the second coherence criterion.

When the BPSK mode code loop has converged, the estimation of the phase deviation between the two correlation pathways left and right conveys the phase differential $\delta\phi_i$ due to the analogue filters of the receiver which is independent of the satellites (which are assumed perfect). Normally it is therefore necessary to observe a coherent phase deviation, to within measurement errors, between the Satellites. An incoherence may convey the presence of a multi-path, which induces an error in the phase of the local code and a phase shift between the two lobes.

The measurement of the phase shift between the two lobes must be filtered so as to be sufficiently precise at the time of the coherence test, the filtered estimation $\delta\phi_{i\,filtered}$ of the phase differential is therefore used to perform the coherence test.

The coherence criterion is satisfied when, for a first number of satellites Ns greater than or equal to a predetermined minimum $N_0$, the deviation between the filtered estimation $\delta\phi_{i\,filtered}$ of the phase differential and the mean of these estimations over the Ns satellites is less than a predetermined phase differential threshold $\delta\phi$.

$$\sigma\varphi_i = \left| \delta\varphi_{ifiltered} - \frac{1}{Ns} \sum_{i=1\,to\,Ns} \delta\varphi_{ifiltered} \right| \leq S\varphi$$

The threshold is typically less than or equal to:

$$S\varphi = 30° \cdot \frac{2\pi}{360}$$

The minimum number $N_0$ of satellites is typically greater than or equal to 7. By making the switch to the tracking phase conditional on a coherence test on the filtered estimations of the phase differentials for several digital processing channels it becomes possible to avoid most cases of false lock-ons onto secondary peaks due to multi-paths that may bias the convergence of the code.

Tracking mode is switched to when the convergence criterion is satisfied.

Tracking is carried out in reconstituted BOC mode, that is to say for each satellite, the right and left components of the signal received are demodulated independently, in parallel and in BPSK mode, a compensation of the phase differential is carried out, and the complex outputs of the two correlation pathways are summed in a coherent manner. The phase of the code and the phase of the central carrier are tracked in a coherent manner by means respectively of a central carrier loop and of a code loop. The phase differentials estimated are also corrected by virtue of the satellite signals themselves.

This type of tracking in reconstituted BOC mode as well as the way of correcting the analogue defects are described in patent application FR 2892202 which forms an integral part of the description.

In the case of the application to a double carrier shift carrier signal, there is a single local code, a single digital phase integrator for the local code phase, a single digital phase integrator for the phase of the local central carrier and distinct correlation pathways between the two lobes.

Figure 9:
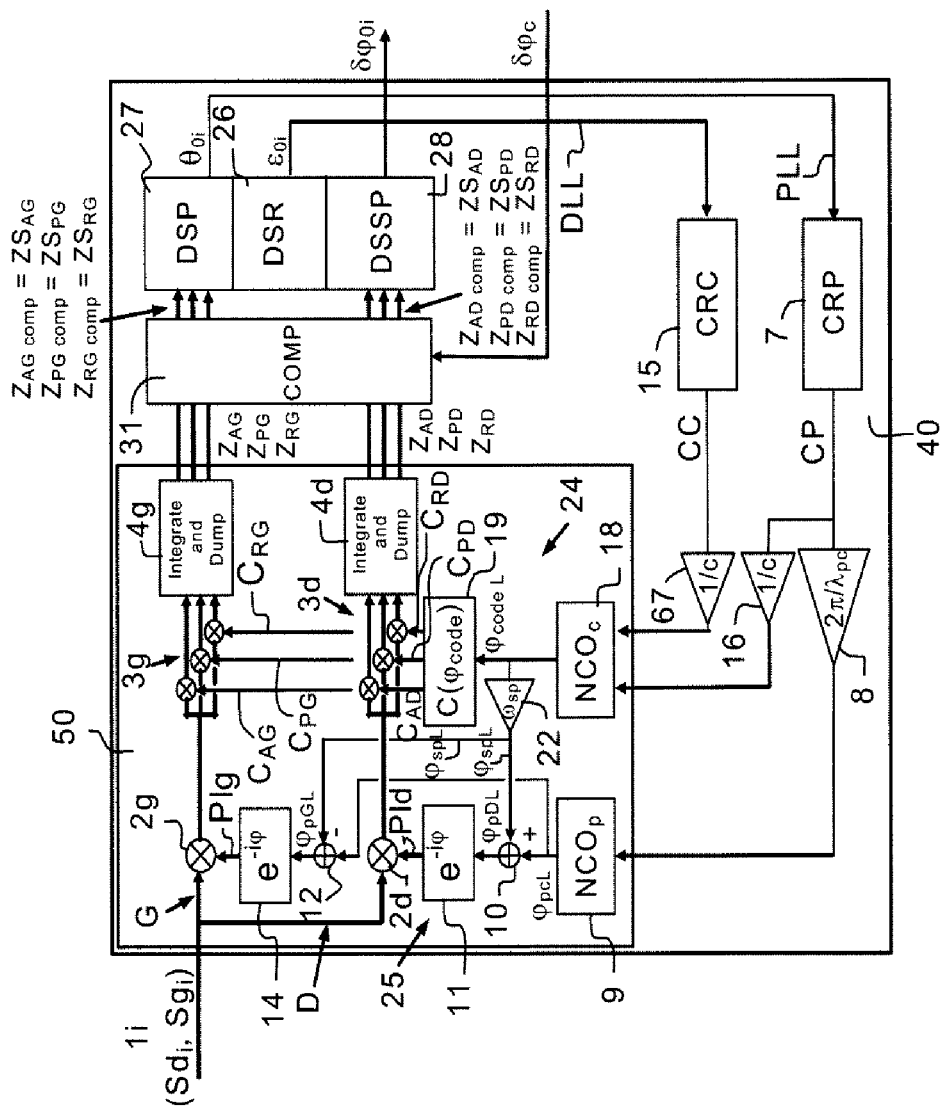
FIG. 9 is a block diagram of a receiver, more particularly of a digital processing channel of a radionavigation receiver able to implement the tracking step of a location method according to the invention.

Represented in FIG. 9 is a digital processing channel for a satellite of index i, able to carry out the tracking phase.

The software part 40 is modified. The code corrector CRC, 15 is a filter with one input, namely the estimations of the code error and one output, the code corrector commands CC. The code corrector CRC 15 is for example a one-state Kalman filter.

The compensation of the phase differential due to the analogue pathways is carried out by means of a compensator COMP, 31, disposed as in the embodiment represented in FIG. 6, on the basis of an estimation of the phase differential $\delta\phi_c$ common to all the satellites and performed on the various satellites which are in tracking mode by an averaging filter such as described in patent application FR 2892202. The complex product-based compensation scheme is used to correct at the output of the correlators the phase differential between the two pathways. The compensation is therefore the same for all the satellites.

Upon switching to tracking on several satellites at the same time the estimation of the common phase differential $\delta\phi_c$ is initialized, within the averaging filter to the mean $\delta\phi$mean of the filtered estimations ($\delta\phi_{i\,filtered}$) of the phase differentials ($\delta\phi_i$) on completion of the ambiguity resolution phase, this mean being averaged over the Ns satellites complying with the convergence criterion for switching to tracking mode:

$$\delta\varphi\text{mean} = \frac{1}{Ns} \sum_{i=1\,to\,Ns} \delta\varphi_{ifiltered}$$

The common compensation $\delta\phi_c$ is thereafter maintained at each instant by the averaging filter on the basis of the instantaneous estimations ($\delta\phi_{0i}$) of the phase differentials performed on all the satellites in tracking mode, such as described in patent application FR 2892202.

$$\delta\phi_{0i} = (2\pi/\lambda_{SP}) \cdot \{Re[ZS_{\Delta G} \cdot ZS_{PG}^*] + Re[ZS_{\Delta D} \cdot ZS_{PD}^*]\}/\mu$$

After compensation, the two correlation pathways left and right are summed in a coherent manner so as to reconstitute the equivalent of a BOC correlation pathway. The coherent sum is carried out before the code and central carrier phase discriminators.

Compensation of the phase differential allows the main peak of the reconstituted BOC function to be made to coincide with the position of the code at the end of the transition (in double delta mode), on condition that the phase differentials $\delta\phi_{i\,filtered}$ estimated by the code correctors on each satellite at the end of the transition are coherent.

The benefit of this scheme with respect to BOC tracking (with a single square sub-carrier-demodulated correlation pathway) is that it makes it possible to preserve the same hardware architecture as in transition, thereby making it possible to limit the costs of the receiver. Moreover, unlike BOC mode tracking, tracking in reconstituted BOC mode makes it possible to correct the phase differential induced by the analogue pathways.

When the second convergence criterion has formed the basis for the switch to tracking mode, then the main peak of the autocorrelation function is certain to be followed. This makes it possible to guarantee the integrity of the code phase measurements provided for calculating the pseudo-distances during the tracking phase.

The tracking phase furthermore makes it possible to improve the precision of the measurements and the robustness to multi-paths and to thermal noise, before the satellite positioning system undertakes the calculation of the pseudo-distances.

As a variant, when the code loop has not converged after a predetermined time, the calculation of the pseudo-distances is performed during the ambiguity resolution step. In this case, a quality factor which improves with time, for example the standard deviation of the code error provided by the Kalman filter, is associated with these measurements. Indeed, given that the code is sure to converge to the correct peak, the precision of the code phase measurements converges with time to that of the tracking. These measurements can exhibit a better integrity than measurements provided in tracking mode in a case of false lock-on. Indeed, when one locks onto the wrong peak (for example, if the switch to tracking mode is made too early), at the start of the tracking phase, one remains locked onto this wrong peak throughout the duration of the tracking phase. The measurements arising from this phase are then precise but not apt.

We have described a receiver able to carry out the ambiguity resolution step in the case where the signal received is a BOC signal. The location method according to the invention is also applicable to other types of signals, for example Alt-BOC signals.

Figure 10A:
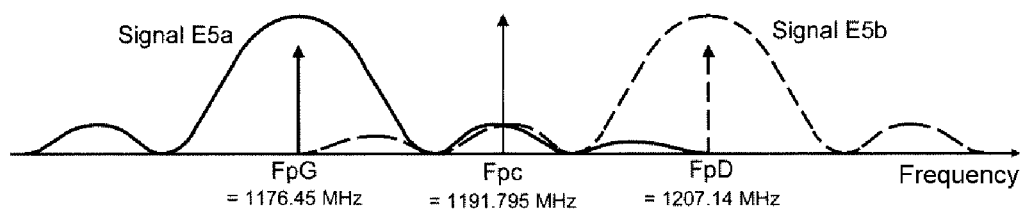
FIG. 10a represents the spectrum of an AltBOC signal.

An AltBOC signal is, as may be seen in FIG. 10a, a signal transmitted by a satellite which comprises two spectral components right and left of respective frequencies Fg and Fg. Each spectral component comprises its own spreading code. The AltBOC signal may be regarded as the sum of two BPSK signals with carriers frequency-shifted, to the right and to the left, with respect to the central carrier. A typical example is the Galileo signal E5ab comprising a central carrier at 1191.795 MHz at satellite level, which is regarded at receiver level as two independent BPSK signals E5a and E5b with carriers at 1176.45 MHz and at 1207.14 MHz respectively.

Figure 10B:
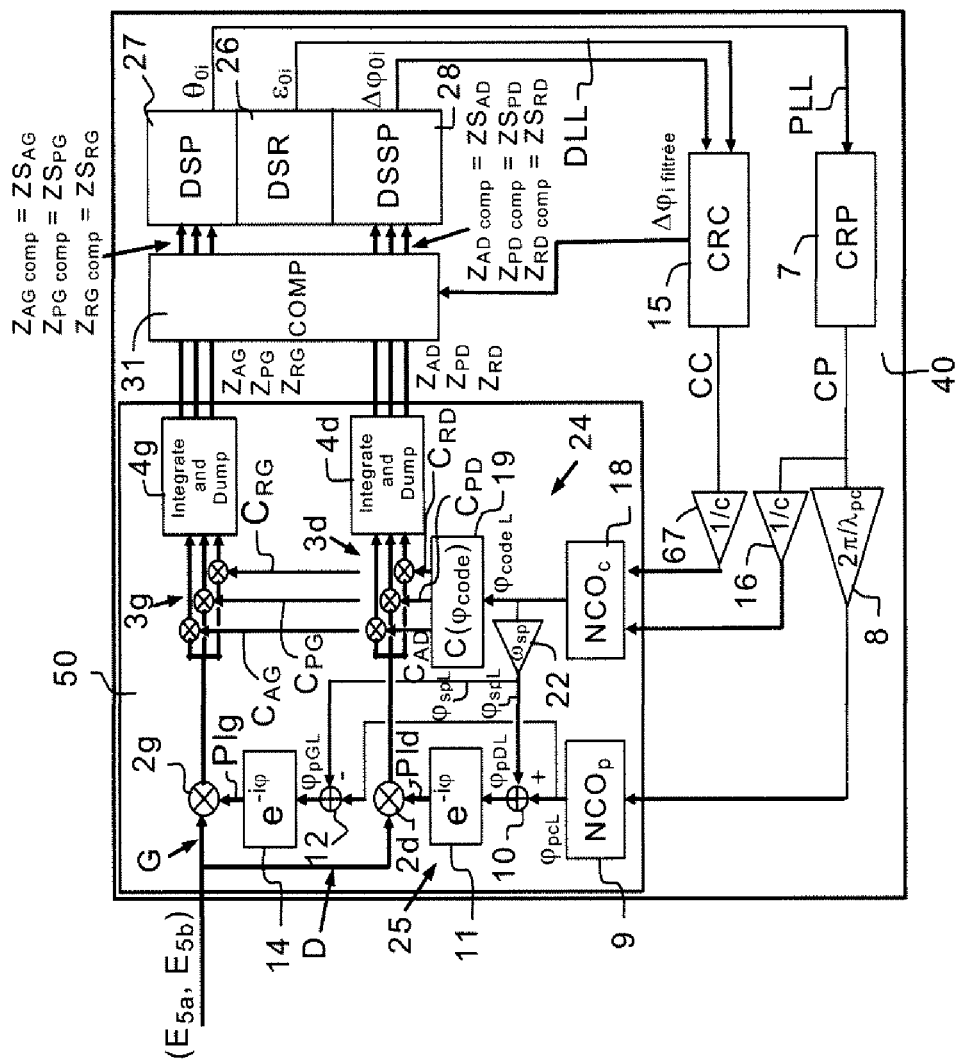

A receiver according to the invention, able to process an AltBOC signal, comprises a modification with respect to receivers able to process a BOC signal. As represented in FIG. 10b, the hardware part 50 of the digital processing channels comprises two code generators 19g and 19d for generating, on the basis of the code phase, the local codes of the respective left and right local components.

It is thus possible to carry out an ambiguity resolution on the basis of two signals transmitted by a satellite, each of the signals constituting a right or left component each having its own spreading code and its own natural frequency.

In this case, the two signals transmitted by one and the same satellite are processed in parallel by the receiver. A digital processing channel able to process the signals transmitted by one and the same satellite comprises two independent right and left correlation channels.

Figure 11:
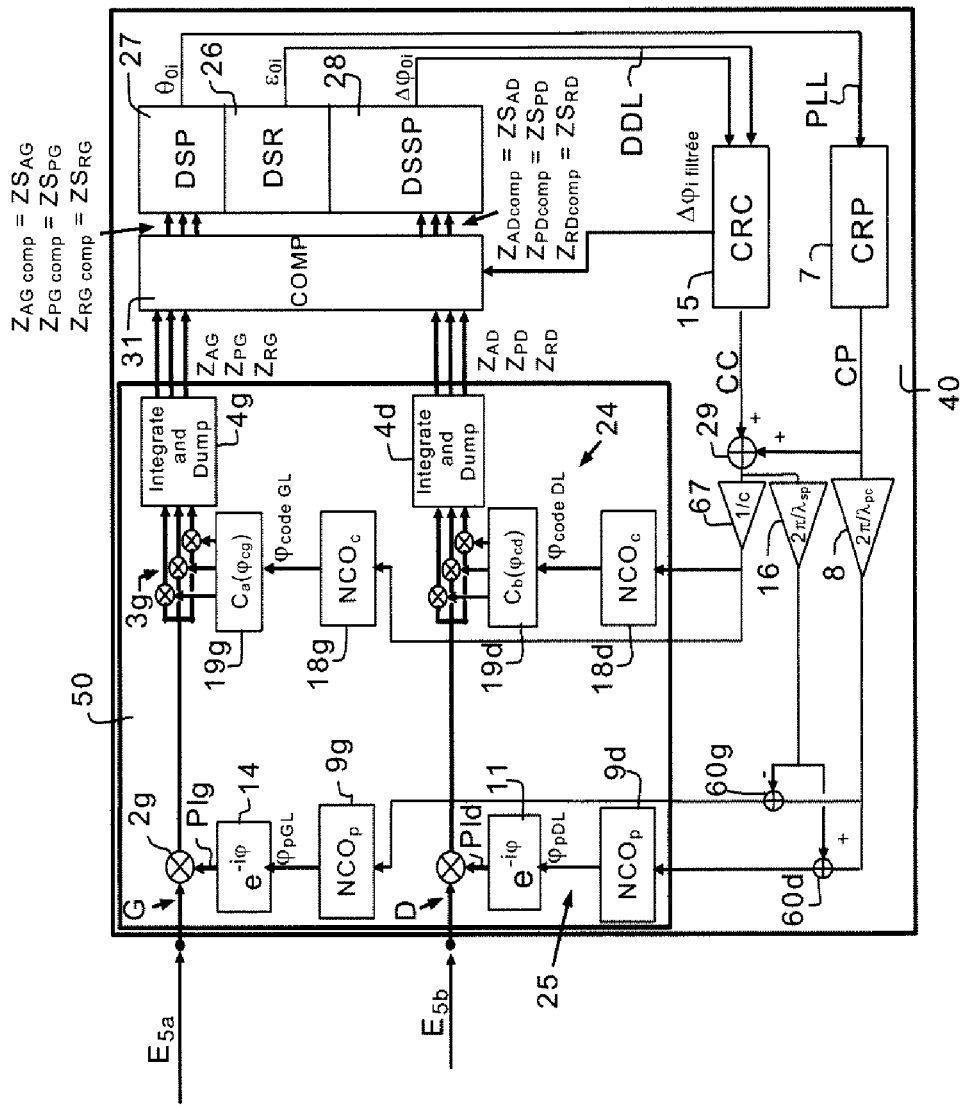

Represented in FIG. 11 is a digital processing channel able to process such signals. Only the elements which are not common to the receivers represented in FIG. 11 and in FIG. 4 will be described hereinafter.

The left channel G is able to receive the left individual signal which is transmitted to the left multiplier 2g. The right channel D is able to receive the right individual signal which is transmitted to the right multiplier 2d. The digital processing channel comprises a local code phase digital integrator NCOc 18g, 18d as well as a local code generator 19g, 19d for each of the correlation pathways left G and respectively right D. The digital processing channel furthermore comprises a carrier phase digital integrator 9g, 9d for each of the correlation pathways left G and respectively right D.

The code phase digital integrators NCOc 18g, 18d and the carrier phase digital integrators 9g, 9d are all controlled respectively by the code correctors commands CC, in terms of code speed, and the central carrier phase correctors commands CP, in terms of carrier speed.

The speed carrier commands are added to the speed code commands by means of an adder 29 before the whole is amplified by a speed code amplifier 67 by a value 1/c.

The speed code commands are thereafter added to the carrier phase correctors commands by means of two adders 60g and 60d before being transmitted respectively to the left 9g and respectively right 9d carrier phase digital integrators.

The code commands are amplified before being transmitted to the adders 60g and 60d by means of a speed amplifier 61 which amplifies these commands by $2\pi/\lambda$sp. The central carrier commands are for their part amplified by $2\pi/\lambda$pc by means of a code amplifier 63 before being transmitted to the two adders 60g and 60d.

The invention claimed is:
1. A method of resolving ambiguity for determining a main peak of an autocorrelation function of signals transmitted by a set of satellites and received by a receiver of a radionavigation system, a received signal originating from a satellite comprising a first spectral component having a first frequency and being a right component of the received signal and a second spectral component having a second frequency and being a left component of the received signal, the left and the right components being spaced apart in frequency, as well as a sub-carrier and a central carrier, the method of resolving ambiguity being carried out in parallel for the signals originating from the various satellites by following the following steps:

the right and left components of the received signal are demodulated in parallel by BPSK demodulation methods comprising:
(i) correlating a first local component, the first local component being a right local component comprising a first complex carrier, the first complex carrier being a right complex carrier, and first local spreading codes being right local codes with the right component of the received signal to produce first complex outputs, the first complex outputs being a complex output of a right correlation pathway, and
(ii) in parallel, correlating a second local component, the second local component being a left local component comprising a second complex carrier, the second complex carrier being a left complex carrier, and second local spreading codes being left local codes, with the left component of the received signal to produce second complex outputs, the second complex outputs being a complex output of a left correlation pathway, tracking a central carrier by means of a central carrier loop which calculates, on the basis of signals arising from the complex outputs of the right and left correlation pathways, estimations of central carrier phase errors so as to generate carrier commands, tracking a pseudo-random code by means of a code loop which calculates, on the basis of signals arising from complex outputs of the right and left correlation pathways, instantaneous estimations of code errors so as to generate code commands, generating new right and left local complex carriers and new codes of the right and left local components on the basis of the code commands and carrier commands, wherein the code commands are furthermore generated on the basis of instantaneous estimations of sub-carrier phase errors, calculated on the basis of signals arising from the complex outputs of the right and left correlation pathways.

2. The method of resolving ambiguity according to claim 1, wherein the generation of the code commands is performed using a two-state Kalman filter adjusted on the basis of the instantaneous estimations of the code errors and of the instantaneous estimations of the sub-carrier phase errors.

3. The method of resolving ambiguity according to claim 1, wherein the signals arising from the first and second complex outputs of the right and left correlation pathways are equal to the outputs of the right and left correlation pathways.

4. The method of resolving ambiguity according to claim 1, wherein the phase difference between the left and right components at the output of the correlation pathways is compensated by means of a filtered estimation of the sub-carrier phase error calculated on the basis of instantaneous estimations of sub-carrier phase errors and of instantaneous estimations of code errors so that the signals arising from the complex outputs of the right and left correlation pathways are outputs of the respectively right and left compensated correlation pathways and in that a coherent tracking of the central carrier is carried out.

5. The method of resolving ambiguity according to claim 4, wherein after the step of generating the code commands and carrier commands:

a local code phase, a local sub-carrier phase and a local central carrier phase are generated, the compensation of the phase difference between the left and right components at the output of the correlation pathways is carried out by adding the filtered estimation of the sub-carrier phase error to the local sub-carrier phase.

6. The method of resolving ambiguity according to claim 4, wherein the compensation is carried out by differential complex rotation of the complex outputs of the right and left correlation pathways, the differential complex rotation applied being a rotation of a phase equal to the filtered estimation of the sub-carrier phase error.

7. The method of resolving ambiguity according to claim 4, wherein a pseudo-coherent tracking of the code is carried out.

8. The method of resolving ambiguity according to claim 1, wherein the correlation is carried out in a tight manner.

9. The method of resolving ambiguity according to claim 2, wherein it converges, for the signal originating from a satellite, when the standard deviation of the code error associated with this signal is less than a predetermined code threshold, the standard deviation being calculated on the basis of the covariance matrix of the Kalman filter.

10. The method of resolving ambiguity according to claim 9, wherein the convergence criterion is satisfied when furthermore a coherence criterion on the phase differential is satisfied, the coherence criterion being satisfied when, for a first number of satellites greater than or equal to a predetermined minimum satellite number, the deviation between the filtered estimation of the phase differential and the mean of these estimations averaged over the first number Ns of satellites, is less than a predetermined phase differential threshold.

11. A method of locating a receiver on the basis of signals transmitted by a set of satellites, comprising an ambiguity resolution step carried out by means of the method according to claim 1.

12. The method of locating a receiver according to claim 11, comprising the ambiguity resolution step is preceded by an energy-based search step and by a transition step.

13. The method of locating a receiver according to claim 11, furthermore comprising a tracking step starting, for a signal received originating from a satellite, when the ambiguity resolution method has converged for this signal.

14. The method of locating a receiver according to claim 13, wherein the tracking step is a reconstituted Binary Offset Carrier (BOC) mode tracking in which the phase differentials due to the analogue pathways are compensated by means of a common compensation the common compensation being initialized, at the commencement of the tracking phase, to the value of the mean of the filtered estimations of the phase differentials on completion of the ambiguity resolution phase, this mean being averaged over the first number Ns of satellites complying with the convergence criterion.

15. The method of locating a receiver according to claim 11, comprising a step of calculating pseudo-distances during the ambiguity resolution step.

16. The method of locating a receiver according to claim 12, comprising a step of calculating pseudo-distances during the tracking step.

17. The method according to claim 1, wherein the received signal is a carrier modulated by means of a Binary Offset Carrier (BOC) method comprising the carrier modulated by a square sub-carrier and a spreading pseudo-random code.

18. A location receiver comprising analogue pathways receiving and digitizing received signals originating from various satellites, a received signal in the received signals comprising a first spectral component having a first frequency and being a right component of the received signal and a second spectral component having a second frequency and being a left component of the received signal, the location receiver comprising digital processing channels each being able to process the received signals originating from the analogue pathways, a digital processing channel comprising a hardware correlation pathway comprising:

right and left correlation channels configured to independently and in parallel demodulate right and left components of the received signal, the right correlation channel comprising:
(i) first correlation means for correlating a first local component, the first local component being a right local component comprising a first complex carrier, the first complex carrier being a right complex carrier, and first local spreading codes being right local codes with the right component of the received signal to produce first complex outputs, the first complex outputs being a complex output of the right correlation channel,
(ii) second correlation means for correlating, in parallel with the correlating carried out by the first correlation means, a second local component, the second local component being a left local component comprising a second complex carrier, the second complex carrier being a left complex carrier, and second local spreading codes being left local codes, with the left component of the received signal to produce second complex outputs, the second complex outputs being a complex output of the left correlation channel,
a code correlation circuit comprising at least one code phase digital integrator, controlled by code and carrier commands, being able to generate local code phases controlling at least one local codes generator and providing the right and left local codes to the respective right and left correlation channels,
a carrier correlation circuit comprising generators of right and left carriers of the right and left local complex carriers on the basis of phases generated by at least one central carrier phase digital integrator, on the basis of at least some carrier commands, the right and left local complex carriers being provided to the right and left correlation channels,
a digital processing channel comprising a software channel comprising a code loop and a central carrier phase loop,
the code loop configured to track a pseudo-random code and comprising a code discriminator to calculate, on the basis of signals arising from the complex outputs of the right and left correlation channels, instantaneous estimations of a code error, and to provide the estimations to a code corrector generating code commands,
the central carrier phase loop configured to track a central carrier and comprising a carrier discriminator calculating, on the basis of signals arising from the complex outputs of the right and left correlation channels, estimations of a central carrier phase error and providing the latter to a carrier corrector producing carrier commands,
wherein the code loop furthermore comprises a sub-carrier phase discriminator calculating, on the basis of the signals arising from the complex outputs of the right and left correlation channels, instantaneous estimations of a sub-carrier phase error these estimations being transmitted to the code corrector which is embodied using a two-state Kalman filter adjusted on the basis of the instantaneous estimations of the code error and instantaneous estimations of the sub-carrier phase error.

19. The location receiver according to claim 18 wherein the signals arising from the complex outputs of the right and left correlation channels are the outputs of the right and left correlation channels.

20. The location receiver according to claim 18, wherein the carrier and code correlation circuit are of the tight correlator type.

21. The location receiver according to claim 18, wherein the code corrector calculates, furthermore, a filtered estimation of the sub-carrier phase error and in that a digital correlation pathway comprises a compensation means able to compensate the phase difference between the left and right components at the output of the correlation channels so as to provide the carrier discriminator, code discriminator and sub-carrier phase discriminator with signals arising from the complex outputs of the right and left correlation channels which are outputs of the respectively right and left compensated correlation channels, the central carrier phase discriminator carrying out a coherent summation of the outputs of the respectively right and left compensated correlation channels before calculating the estimations of the central carrier phase errors.

22. The location receiver according to claim 21, wherein the code discriminator is of the pseudo-coherent type.

23. The location receiver according to claim 21, wherein the compensation means is embodied in the form of a compensator applying a differential complex rotation, of a phase equal to the filtered estimation of the sub-carrier phase error, to the complex outputs of the right and left correlation channels to so as to produce outputs of the respectively right and left compensated correlation channels.

24. The location receiver according to claim 21, wherein the carrier correlation circuit comprises at least one central carrier phase digital integrator, controlled by at least some carrier commands, being able to generate central local carrier phases and to transmit them to at least one local codes generator and in that the hardware correlation pathway comprises a sub-carrier amplifier able to generate a local sub-carrier phase on the basis of the local code phase and a compensation means is embodied in the form of an adder adding the filtered estimation of the sub-carrier phase error to the local sub-carrier phase.

25. The location receiver according to claim 18, wherein the code correlation circuit comprises:
a code phase digital integrator producing a local code phase which is transmitted to at least one local codes generator,
a central carrier phase digital integrator generating a central local carrier phase by means of the carrier commands,
a right adder summing the central local carrier phase and the local sub-carrier phase so as to obtain a right local carrier phase,
a left subtracter subtracting the local sub-carrier phase from the central local carrier phase so as to obtain a left local carrier phase.

26. The location receiver according to claim 25 comprising a local codes generator.

27. The location receiver according to claim 26 comprising a left local codes generator and a right local codes generator.

28. The location receiver according to claim 18, comprising a right code phase digital integrator and a left code phase digital integrator, a left local codes generator and a right local codes generator, a left central carrier phase digital integrator and right central carrier phase digital integrator.

29. The location receiver according to claim 18, wherein the received signal is a carrier modulated by means of a Binary Offset Carrier (BOC) method comprising the carrier modulated by a square sub-carrier and a spreading pseudo-random code.

\* \* \* \* \*